United States Patent
Raj et al.

(10) Patent No.: US 11,743,958 B2
(45) Date of Patent: Aug. 29, 2023

(54) ENABLING WORKERS TO USE A PERSONAL MOBILE DEVICE WITH A WEARABLE ELECTRONIC DEVICE

(71) Applicant: Vocollect, Inc., Pittsburgh, PA (US)

(72) Inventors: Mohit Raj, Hyderabad (IN); Nagaraju Rachakonda, Hyderabad (IN)

(73) Assignee: VOCOLLECT, INC., Pittsburgh, PA (US)

( * ) Notice: Subject to any disclaimer, the term of this patent is extended or adjusted under 35 U.S.C. 154(b) by 276 days.

(21) Appl. No.: 17/247,752

(22) Filed: Dec. 22, 2020

(65) Prior Publication Data

US 2022/0141899 A1   May 5, 2022

(30) Foreign Application Priority Data

Oct. 29, 2020  (IN) .............................. 202011047277

(51) Int. Cl.
  *H04W 76/15*   (2018.01)
  *H04W 76/34*   (2018.01)
  *H04W 4/80*    (2018.01)

(52) U.S. Cl.
  CPC .............. *H04W 76/15* (2018.02); *H04W 4/80* (2018.02); *H04W 76/34* (2018.02)

(58) Field of Classification Search
  CPC ....... H04W 76/15; H04W 4/80; H04W 76/34; H04W 4/16; H04W 76/10; H04W 76/14;
  (Continued)

(56) References Cited

U.S. PATENT DOCUMENTS

2002/0068610 A1\* 6/2002 Anvekar ............. H04M 1/6066
                                                    455/560
2004/0063452 A1\* 4/2004 Tomoda .................. H04M 1/57
                                                    455/518
(Continued)

FOREIGN PATENT DOCUMENTS

EP         1404067 A2 \*  3/2004  .............. H04M 1/57
EP         1404067 A2     3/2004
(Continued)

OTHER PUBLICATIONS

European Search Report and Search Opinion received for EP Application No. 21205020.7, dated Mar. 31, 2022, 8 pages.

*Primary Examiner* — Habte Mered
(74) *Attorney, Agent, or Firm* — Alston & Bird LLP

(57) ABSTRACT

A method for facilitating picking of an incoming call on a device is described here. The method includes transmitting, by a processor of a work device, a workflow execution command to a first device communicatively coupled to the work device. In an example, the method comprises receiving at the work device, a first message indicative of occurrence of an event on a second device communicatively coupled to the work device. The method further comprises sending, by the processor, a first request to the first device to terminate a first connection with the work device. The method includes sending, by the processor, a second request to communicatively couple the first device to the second device. The method includes receiving, by the processor, a second message indicative of completion of the event on the second device. Thus, terminating, by the processor, a second connection of the first device with the second device.

20 Claims, 15 Drawing Sheets

(58) Field of Classification Search
CPC ............... H04W 76/30; H04M 1/6066; H04M 2250/02; H04M 1/72412; H04M 1/72484; G06F 1/163; G06F 3/165; G08C 17/02; G08C 2201/93; G10L 15/22; G10L 2015/223

See application file for complete search history.

(56) References Cited

U.S. PATENT DOCUMENTS

| | | | |
|---|---|---|---|
| 2007/0206829 A1* | 9/2007 | Weinans | H04M 1/6066 381/370 |
| 2007/0249295 A1* | 10/2007 | Ukita | H04M 1/72412 455/73 |
| 2017/0078428 A1* | 3/2017 | Unter Ecker | H04W 4/80 |
| 2017/0295272 A1* | 10/2017 | Gan | H04M 1/725 |
| 2018/0098145 A1 | 4/2018 | McGary et al. | |
| 2019/0114572 A1* | 4/2019 | Gold | G06Q 10/063114 |
| 2019/0380018 A1* | 12/2019 | Tian | H04W 4/80 |
| 2020/0059547 A1* | 2/2020 | Wang | H04M 1/72433 |
| 2022/0141912 A1* | 5/2022 | Grover | H04W 76/23 455/39 |
| 2022/0321368 A1* | 10/2022 | Lee | H04L 12/189 |

FOREIGN PATENT DOCUMENTS

| | | | | |
|---|---|---|---|---|
| EP | 1443737 A1 * | 8/2004 | | H04M 1/6033 |
| WO | 2006/055884 A2 | 5/2006 | | |

* cited by examiner

ENABLING WORKERS TO USE A PERSONAL MOBILE DEVICE WITH A WEARABLE ELECTRONIC DEVICE

CROSS-REFERENCE TO RELATED APPLICATIONS

This application claims priority to and the benefit of foreign Indian Provisional Patent Application Serial No. 202011047277, filed on Oct. 29, 2020 with the Government of India Patent Office and entitled "Enabling Workers To Use A Personal Mobile Device With A Wearable Electronic Device," which is incorporated herein by reference in its entirety.

TECHNOLOGICAL FIELD

Example embodiments described herein relate generally to systems, methods, and apparatuses for enabling a communication between a wearable electronic device and a personal mobile device.

BACKGROUND

In modern production environments and warehouses, it is increasingly desirable for human operators to be able to record data and to control electronic devices in a "hands-free" mode, typically via speech control. This typically entails the use of portable electronic voice-processing devices which can detect human speech, interpret the speech, and process the speech to recognize words, to record data, and/or to control nearby electronic systems.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method facilitating picking of an incoming call on a first device. The method includes receiving, by a processor of a wearable electronic device, a first message indicative of an initiation of an event on a first device. The first device is communicably coupled to a second device and the second device is communicatively coupled to the wearable electronic device. The event corresponds to an incoming call request on the first device. Further, the method includes pausing, by the processor, a workflow operation executing on at least one of the second device and the wearable electronic device. Furthermore, the method includes terminating, by the processor, a first connection of the wearable electronic device with the second device. Furthermore, the method includes sending, by the processor, a first connection request to the first device via the second device to communicatively couple the wearable electronic device with the first device. Furthermore, the method includes receiving, by the processor, a second message indicative of completion of the event on the first device. Furthermore, the method includes terminating, by the processor, a second connection of the wearable electronic device with the first device. Further, the method includes sending, by the processor, a second connection request to communicatively couple the wearable electronic device to the second device. Furthermore, the method includes resuming the workflow operation on at least one of the second device and the wearable electronic device.

According to some example embodiments, the method includes transmitting, by a processor of a work device, a workflow execution command to a first device communicatively coupled to the work device. The workflow execution command is to output a task to a user for execution of a workflow. Further, the method includes receiving at the work device, a first message indicative of occurrence of an event on a second device communicatively coupled to the work device. Furthermore, the method includes sending, by the processor, a first request to the first device to terminate a first connection with the work device. In this regards, the first request is received in response to occurrence of an event on the second device. Further, the method includes terminating, by the processor, the first connection of the first device with the work device. Furthermore, the method includes sending, by the processor, a second request to communicatively couple the first device to the second device. The method further includes receiving, by the processor, a second message indicative of completion of the event on the second device. Furthermore, the method includes terminating, by the processor, a second connection of the first device with the second device.

A device is described in accordance with some example embodiments. The device includes a memory to store computer-executable instructions and a processor, that performs operations in response to executing the computer-executable instructions. The operations can include receiving a first message indicative of occurrence of an event on a first device. The first device is communicatively coupled to a second device and the second device is communicatively coupled to a wearable electronic device. In this regard, the event corresponds to an incoming call request on the first device. Further, the operations can include pausing a workflow operation executing on at least one of the second device and the wearable electronic device. Furthermore, the operations can include terminating a first connection of the wearable electronic device with the second device. Furthermore, the operations can include sending a first connection request to the first device via the second device to communicatively couple the wearable electronic device with the first device. Further, the operations can include receiving a second message indicative of completion of the event on the first device. Furthermore, the operations can include terminating a second connection of the wearable electronic device with the first device. The operations further can include sending a second connection request to communicatively couple the wearable electronic device to the second device. Furthermore, the operations can include resuming the workflow operation on at least one of the second device and the wearable electronic device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
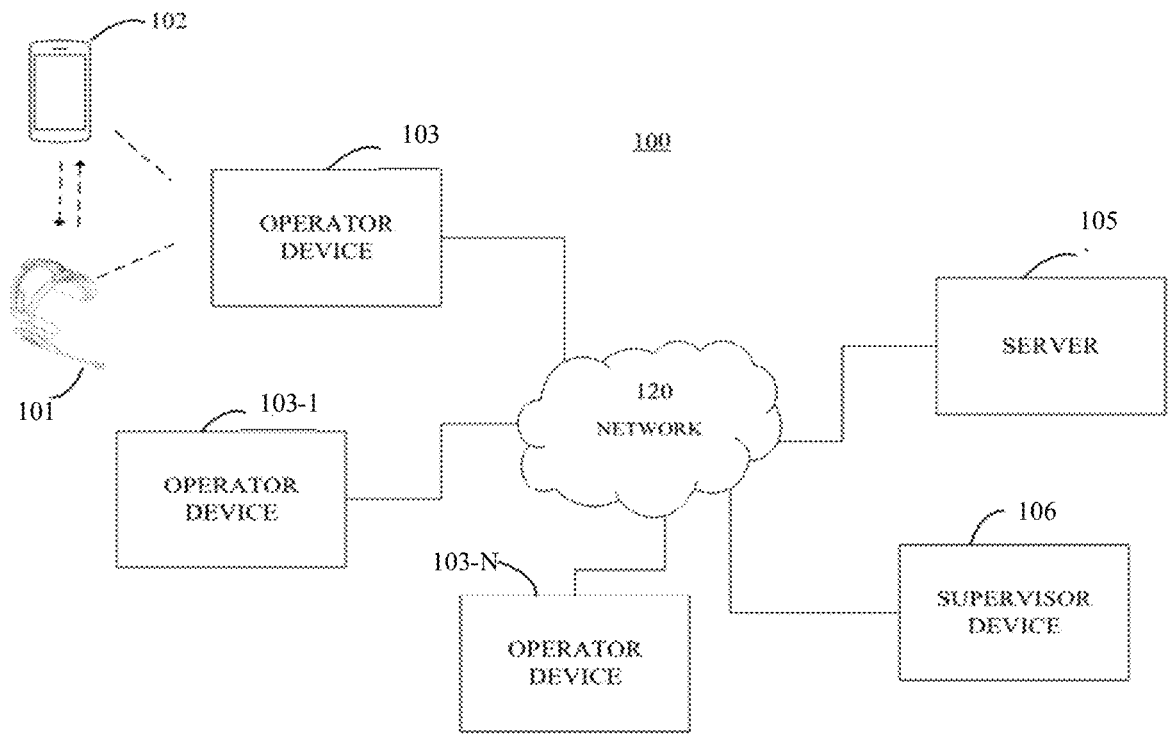
FIG. 1 illustrates a schematic of a workflow performance system according to an example embodiment.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Generally, in a work environment, it can be desirable to notify a worker about an incoming call on a worker's personal device. In an example embodiment, the worker might be performing a workflow operation utilizing a wearable electronic device and a mobile device (for example, a handheld computer). The on-going workflow execution can be paused in response to occurrence of an event (for example, an incoming call) on the worker's personal phone. A connection between a wearable electronic device worn by the worker and the mobile device can be temporarily terminated to establish a connection between the wearable electronic device and the worker's personal device. Once the call has been completed on the personal device, the workflow execution may be resumed from the point where it was paused.

In an example (e.g. in material handling environment) it can be desirable to notify the worker about an incoming call event on personal device and thereby facilitate a hands free picking of the incoming call. The worker, who may be working in a harsh industrial environment or other demanding environment, might need to concentrate on an allocated task without any interruption. However, in response to receiving a call, the worker might get an urge to pick up the call that in turn could cause a dangerous situation. For example, a worker could be performing a task that can comprise climbing a ladder. The worker's hands can be engaged in holding the ladder. If an incoming call event occurs on the worker's personal device, the worker's attention can be disrupted, leading to the worker slipping or falling. Therefore, the present disclosure can provide an efficient method of providing a safe working environment and thereby facilitate the worker accepting or rejecting incoming calls based on voice commands. Further, the worker might not need to pick up the call manually using hands. Details of various example embodiments for generating the alerts, are described in reference to FIGS. 1-15 hereinafter.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device or the computing platform, can also refer to any of the electronic devices, as described herein. In some example embodiments, the computing platform may include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the computing platform can refer to a server system that can manage the deployment of one or more electronic devices throughout a physical environment. In some example embodiments, the computing platform may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

Referring now to FIG. 1, illustrated is a workflow performance system 100 including an example network architecture for a system, which may include one or more devices and sub-systems that can be configured to implement some embodiments discussed herein. For example, workflow performance system 100 can include server 105, which can include, for example, the circuitry disclosed in FIGS. 2-4, a server, or database, among other things (not shown). The server 105 may include any suitable network server and/or other type of processing device. In some embodiments, the server 105 may receive requests and transmit information or indications regarding such requests to operator devices 103-103N and/or one or more supervisor devices 106. The operator devices 103-103N referred herein can correspond to electronic devices that may be used by operators (e.g. workers) in a work environment while performing various tasks. Further, the supervisor devices 106 referred herein can correspond to electronic devices used by a supervisor of the operators in the work environment. In an example, the work environment can correspond to a warehouse or inventory and the supervisor can be a warehouse manager.

In some example embodiments, the server 105 can communicate with one or more operator devices 103-103N and/or one or more supervisor devices 106 via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. In some embodiments, Bluetooth may be used to communicate between devices. Further, the network 120 may include a public network, such as the Internet, a private network, such as an intranet, or combinations thereof, and may utilize a variety of networking protocols now available or later developed including, but not limited to TCP/IP based networking protocols.

In some example embodiments, the network 120 can include, but are not limited to, a Wireless Fidelity (Wi-Fi) network, a Piconet, a Personal Area Network (PAN), Zigbee, and a Scatternet. In some examples, the network 120 can correspond to a short-range wireless network through which the operator devices 103-103N can communicate with each other using one or more communication protocols such as, but are not limited to, Wi-Fi, Bluetooth, Bluetooth low energy (BLE), Zigbee, Ultrasonic frequency based network, and Z-Wave. In some examples, the network 120 can correspond to a network in which the plurality of electronic devices can communicate with each other using other various wired and wireless communication protocols such as Transmission Control Protocol and Internet Protocol (TCP/IP), User Datagram Protocol (UDP), and 2G, 3G, or 4G communication protocols. In some examples, the network 120 can correspond to any communication network such as, but not limited to, LORA, cellular (NB IoT, LTE-M, Leaky Feeder Coax, etc.)

In some example embodiments, the operator devices 103-103N, supervisor device 106, and/or server 105 may each be implemented as a computing device, such as a personal computer and/or other networked device, such as a cellular phone, tablet computer, mobile device, point of sale terminal, inventory management terminal etc. The depiction in FIG. 1 of "N" members is merely for illustration purposes. Further, while only one supervisor device 106 is illustrated in FIG. 1, in some embodiments, multiple or a plurality of supervisor device 106 may be connected in the system. Furthermore, any number of users, operator devices and/or supervisor devices may be included in the workflow performance system 100. In one embodiment, the operator devices 103-103N and/or supervisor devices 106 may be configured to display an interface on a display of the respective device for viewing, creating, editing, and/or otherwise interacting with the server. According to some embodiments, the server 105 may be configured to display the interface on a display of the server 105 for viewing, creating, editing, and/or otherwise interacting with information on the server 105. In some embodiments, an interface of operator devices 103-103N and/or supervisor device 106 may be different from an interface of a server 105. Various components of the present system may be performed on one or more of the operator devices 103-103N, supervisor device 106, or server 105. Workflow performance system 100 may also include additional client devices and/or servers, among other things.

According to some example embodiments, the operator devices 103-103N can include, for example, but not limited to, an electronic device 102 (e.g. a mobile device, a PDA etc.) and a voice-controlled apparatus 101 (e.g. a headset device, a wearable head mounting device etc.). In this regard, an operator in the work environment can use the electronic device 102 and/or the voice-controlled apparatus 101 to perform one or more operations in the work environment. For instance, in some example embodiments, the operator devices 103-103N can be used by operators to execute a workflow operation that can include one or more tasks. In this regard, in some examples, the workflow operation can include a sequence or series of steps to be performed by the operator. In some example embodiments, one or more steps of the workflow operation can be provided in form of voice directed instructions or graphical user interface (GUI) based instructions to the operators on the operator devices 103-103N.

As an example, in a work environment (e.g. a warehouse, an industrial environment, a distribution center, etc.), an operator can use the electronic device 102 that can be preconfigured with an application (e.g. a mobile application) to execute a workflow operation. For instance, in some examples, the operators can use these devices (i.e. the operator devices 103-103N, electronic devices, for example, 102) for automatic identification and data capturing of information and to improve productivity in the work environment. In some examples, the application can be used to execute various steps of the workflow operation. According to some example embodiments, the application can be installed on at least one of the electronic device 102 and the voice-controlled apparatus 101 and can be used to generate instructions for the operators at each step of the workflow operation. These instructions can be provided on the electronic device 102 and/or the voice-controlled apparatus 101.

According to some example embodiments, the voice-controlled apparatus 101 can be used to provide instructions to the operators in form of 'voice prompts' to perform various activities in the work environment. For instance, in an example, for a picking workflow operation, the operators can be provided instructions in form of voice prompts on the voice-controlled apparatus 101 for picking various items in an inventory. The voice prompts in such case may include instructions for the operators, like, but not limited to, 'reach to a location of the inventory', 'confirm a check-digit associated with the location', 'identify an item from amongst several item', 'confirm a stock-keeping unit (SKU) associated with the item', 'pick the item', 'move to next location', and so on. Further, in some example embodiments, the electronic device 102 can be configured to provide instructions to the operators in visual form i.e. instructions that can be displayed on a GUI of the electronic device 102. Accordingly, the operators can perform a step of the workflow operation based on instructions provided in the voice prompt and/or visual prompt. Further, the electronic device 102 and/or the voice-controlled apparatus 101 can be configured to receive operator's response to the instructions. For instance, as the operators perform the task, the operators can provide a 'voice response' and/or a GUI input based response on the voice-controlled apparatus 101 and/or the electronic device 102, respectively.

Illustratively, the operator devices 103-103N can be communicatively coupled over the network 120. Similarly, in accordance with some example embodiments, the electronic device 102 can be communicatively coupled to the voice-controlled apparatus 101 via the network 120. As an example, the voice-controlled apparatus 101 can be communicatively coupled to the electronic device 102 over a Bluetooth communication based network. In this regard, the electronic device 102 can exchange data and various commands with the voice-controlled apparatus 101 using the Bluetooth network.

In some examples, voice-based instructions and visual-based instructions of the task of the workflow can be provided simultaneously on the voice-controlled apparatus 101 and the electronic device 102, respectively. In this regard, a state of execution of workflow on the electronic device 102 and/or the voice-controlled apparatus 101 can be synchronized such that, either of a voice response and/or a GUI based input can be provided by the operator in response to the voice prompt and/or visual instruction for a same step of workflow operation to cause the workflow operation to move to a next state on both the voice-controlled apparatus 101 and the electronic device 102.

According to some example embodiments, the operator devices 103-103N can receive a file including one or more workflows that are to be executed on the operator device 103-103N. In this regard, according to some example embodiments, a workflow operation can be executed on the operator devices 103-103N (e.g., the electronic device 102 and/or the voice-controlled apparatus 101) based on exchange of messages between the devices. In some example embodiments, the operator devices 103-103N can receive the file including the one or more workflows from the server 105.

According to some example embodiments, the electronic device 102, the voice-controlled apparatus 101, the operator devices 103-103N, supervisor device 106, and/or server 105 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the operator devices 103-103N, supervisor device 106, and/or server 105 may include one or more output devices, including but not limited to a display, a speaker, a haptic feedback mechanism, a printer, lights, any other mechanism capable of presenting an output to a user, or any combination thereof.

The operator devices 103-103N, supervisor device 106, and/or server 105 may include components for monitoring and/or collecting information regarding the user or external environment in which the component is placed. For instance, the operator devices 103-103N, supervisor device 106, and/or server 105 may include sensors, scanners, and/or other monitoring components. In some embodiments, scanners may be used to determine the presence of certain individuals or items. For example, in some embodiments, the components may include a scanner, such as an optical scanner, RFID scanner, and/or other scanner configured to read human and/or machine readable indicia physically associated with an item.

Figure 2:
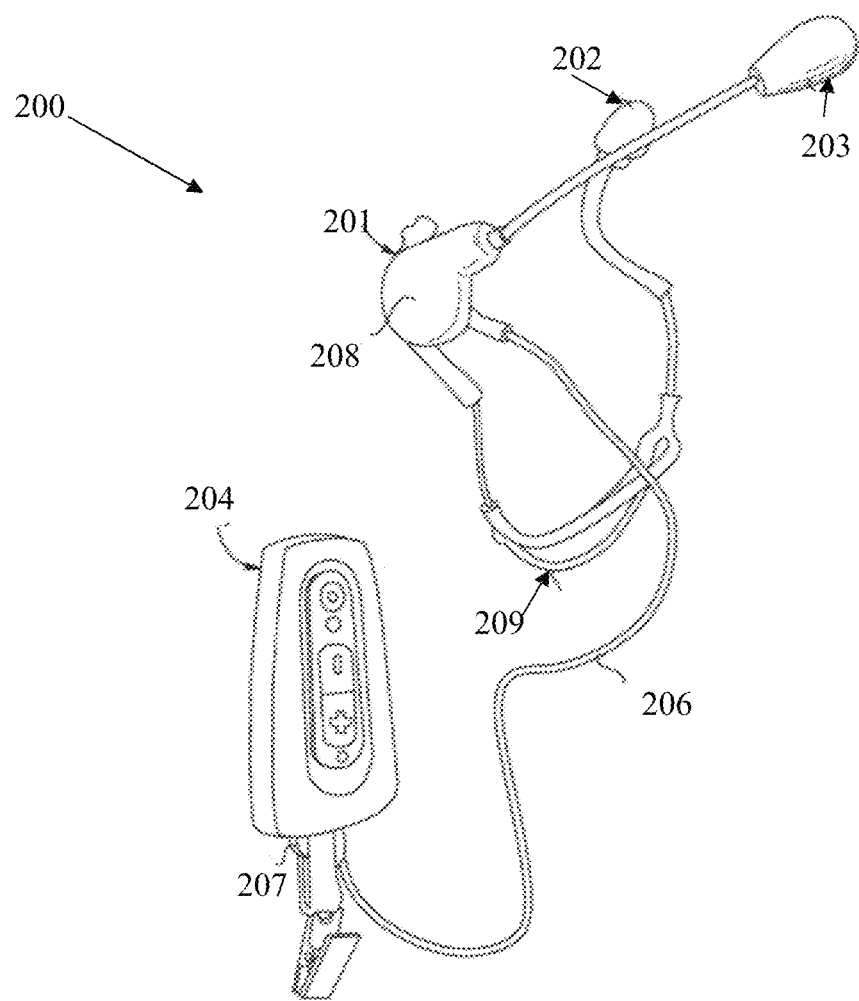
FIG. 2 illustrates an exemplary voice-controlled apparatus used for performing a workflow operation, according to an example embodiment.

FIG. 2 illustrates an exemplary voice-controlled apparatus 200 according to an example embodiment. In the embodiment illustrated in FIG. 2, the voice-controlled apparatus 200 can correspond to a headset that can include a wireless enabled voice recognition device that utilizes a hands-free profile.

In accordance with some example embodiments, the headset may be substantially similar to the headset disclosed in U.S. Provisional Patent Application No. 62/097,480 filed Dec. 29, 2014, U.S. Provisional Patent Application No. 62/101,568, filed Jan. 9, 2015, and U.S. patent application Ser. No. 14/918,969, and the disclosures therein are hereby incorporated by reference in their entireties.

In accordance with an example embodiment, as illustrated, the voice-controlled apparatus 200 can include an electronic module 204. In this embodiment, some elements can be incorporated into an electronics module 204 rather than the headset 201, to provide a long battery life consistent with long work shifts. As an example, one or more components of circuitry 200 may be incorporated in the electronic module 204 and/or the headset 201. In some example embodiments, the electronics module 204 can be remotely coupled to a light-weight and comfortable headset 201 secured to a worker head via a headband 209. In some example embodiments, the headband 209 can be a band that is designed to fit on a worker's head, in an ear, over an ear, or otherwise designed to support the headset. The headset 201 can include one or more speakers 202 and can further include one or more microphones. For instance, in the embodiment illustrated in FIG. 2, the headset 201 includes microphones 203, 208. According to some example embodiments, the microphone 208 can provide noise cancellation by continuously listening to and blocking environmental sounds to enhance voice recognition and optionally provide for noise cancellation. In some embodiments (not shown), the electronics module 204 can be integrated into the headset 201 rather than being remotely coupled to the headset 201. Various configurations of the voice-controlled apparatus 200 can be used without deviating from the intent of the present disclosure.

In some example embodiments, the electronics module 204 can be used to offload several components of the headset 201 to reduce the weight of the headset 201. In some embodiments, one or more of a rechargeable or long life battery, display, keypad, Bluetooth® antenna, and printed circuit board assembly (PCBA) electronics can be included in the electronics module 204 and/or otherwise incorporated into the voice-controlled apparatus 200.

In the embodiment illustrated in FIG. 2, the headset 201 can be coupled to the electronics module 204 via a communication link such as a small audio cable 206 but could instead communicate with the electronics module 204 via a wireless link. In an example embodiment, the headset 201 can be of a low profile. For instance, headset 201 can be minimalistic in appearance in some embodiments, such as a Bluetooth earpiece/headphone.

According to some example embodiments the electronics module 204 can be configured to be used with various types of headsets 201. In some example embodiments, the electronics module 204 can read a unique identifier (I.D.) of the headset 201, which can be stored in the circuitry of the voice-controlled apparatus 200 (e.g., the circuitry 200) and can also be used to electronically couple the speakers and microphones to electronics module 204. In one embodiment, the audio cable 206 can includes multiple conductors or communication lines for signals which can include a speaker +, speaker –, ground digital, microphone, secondary microphone, and microphone ground. In some examples, the electronics module 204 can utilize a user configurable attachment 207, such as a plastic loop, to attach to a user. For instance, in the embodiment illustrated in FIG. 2, the electronics module 204 can be mounted to a worker torso via a lapel clip and/or lanyard. When a wireless link between the headset 201 and electronics module 204 is used, such as a Bluetooth type of communication link, the headset 201 can include a small lightweight battery. The communication link can provide wireless signals suitable for exchanging voice communications.

In some embodiments, voice templates for performing a speaker dependent training of a speech recognition model can be stored locally in the electronic module 204 and/or the headset 201 as part of the circuitry 200 to recognize a user's voice interactions and may convert the interaction into text based data and commands for interaction with an application running in the circuitry 200. For example, the voice-controlled apparatus 200 can perform voice recognition in one embodiment utilizing the voice templates. According to some example embodiments, first few stages of voice recognition can be performed in the voice-controlled apparatus 200, with further stages performed on a server 105. In further embodiments, raw audio can be transmitted from voice-controlled apparatus 200 to the server 105 where the final stages of voice recognition can be completed. Alternatively, in some example embodiments, the voice recognition can be performed on the voice-controlled apparatus 200.

Figure 3:
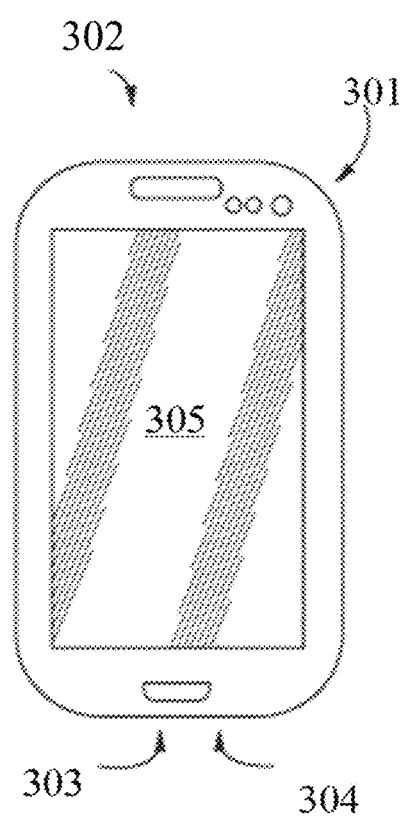
FIG. 3 illustrates an exemplary user device according to an example embodiment.

FIG. 3 illustrates an exemplary user device according to an example embodiment. In the embodiment illustrated in FIG. 3, the user device is a handset 302 (e.g., a mobile device or tablet device). The handset 302 may include one or more components of circuitry as explained with regards to FIG. 1 and may include one or more of the components discussed with regards to the headset of FIG. 2 (e.g., voice templates, speech encoders, etc.). The handset 302 may include one or more microphones 303 and one or more speakers 304, which may be connected to a set of headphones. The handset 302 can also include one or more antenna. The microphone 303 receives speech or sound and transmits the received speech and sound to one or more components of circuitry 400 (to be shown in FIG. 4) in the handset 302. The speakers 304 receive an audio transmission from one or more components of circuitry 400 in the handset 302 and output the audio transmission in the form of speech or sound. In an embodiment, the speakers 304 can also include noise cancellation. The handset 302 may connect with one or more other operator devices 103-103N and/or server 105 as explained with regards to FIG. 1. For instance, in some embodiments, the handset 302 may connect to a wireless headphone via a Bluetooth connection, where the wireless headphone includes a microphone and speaker for receiving speech and outputting speech or sound. The handset 302 can also include a user input device and output device (such as the display 305 forming an interface) to send and receive additional non-auditory information from circuitry 400, whether incorporated into the handset 302 or in other operator devices 103-103N and/or server 105. The display 305 of FIG. 3 may be a backlit LCD or OLED display. With the use of a handset 302 having one or more microphones 303 and one or more speakers 304, a user can communicate with a central server (e.g., server 105) and/or with other user devices (e.g., operator devices 103-103N).

In the embodiment illustrated in FIG. 3, the user device also includes a sensor 301 configured to determine the location of the user device. The sensor 301 may include, but may not be limited to, a ground imaging sensor, an electro-optic sensor, a GPS receiver, accelerometer, and the like. In an embodiment, the sensor 301 may determine a location of the user by determining GPS coordinates of the operator devices 103-103N and/or a vehicle. The sensor 301 may communication or interact with other components of the circuitry 400, such as processor 404, to determine whether the user is in transit, such as in transit to a desired location. The processor 404 may then interact with the display 305 to lock the display while the user is in transit or in motion. The processor 404 may also unlock the display 305 when the user is determined to not be in transit or in motion and/or has arrived at the desired location. One or more applications may be used to lock and unlock the display 305 depending on the status of the user and/or user device. In another embodiment, the current location of the user may be obtained based on a current time and by referring to a pre-determined delivery schedule. Alternatively, a current location of the user may be obtained from a completed workflow solution task. By way of an example, if a user completed a delivery a retail store, the user may update an associated workflow task as "Completed" or "Delivered." This information may be used by the operator devices 103-103N and/or the server 105 to identify the location of the retail store as a current location of the user.

Although FIG. 3 illustrates one example of a handheld device, various changes may be made to FIG. 3. For example, all or portions of FIG. 3 may represent or be included in other handheld devices and/or vehicle communication devices and may be used in conjunction with a headset such as the headset of FIG. 2. Also, the functional division shown in FIG. 3 is for illustration only. Various components could be combined, subdivided, or omitted and additional components could be added according to particular needs.

One suitable device for implementing the present disclosure may be the TALKMAN® product available from VOCOLLECT™ of Pittsburgh, Pa. In accordance with one aspect of the present disclosure, the user device uses a voice-driven system, which may use speech recognition technology for communication. In an embodiment, the user device may provide hands-free voice communication between the user and the user device. To that end, digital information may be converted to an audio format, and vice versa, to provide speech communication between the user device or an associated system and the user. In an example embodiment, the user device may contain digital instructions or receive digital instructions from a central computer and/or a server and may convert those instructions to audio to be heard by the user. The user may then reply, in a spoken language, and the audio reply or the speech input may be converted to a useable digital format to be transferred back to the central computer and/or the server. In other embodiments, the user device may operate independently, in an offline mode, such that speech digitization, recognition and/or synthesis for implementing a voice-driven workflow solution may be performed by the user device itself.

Figure 4:
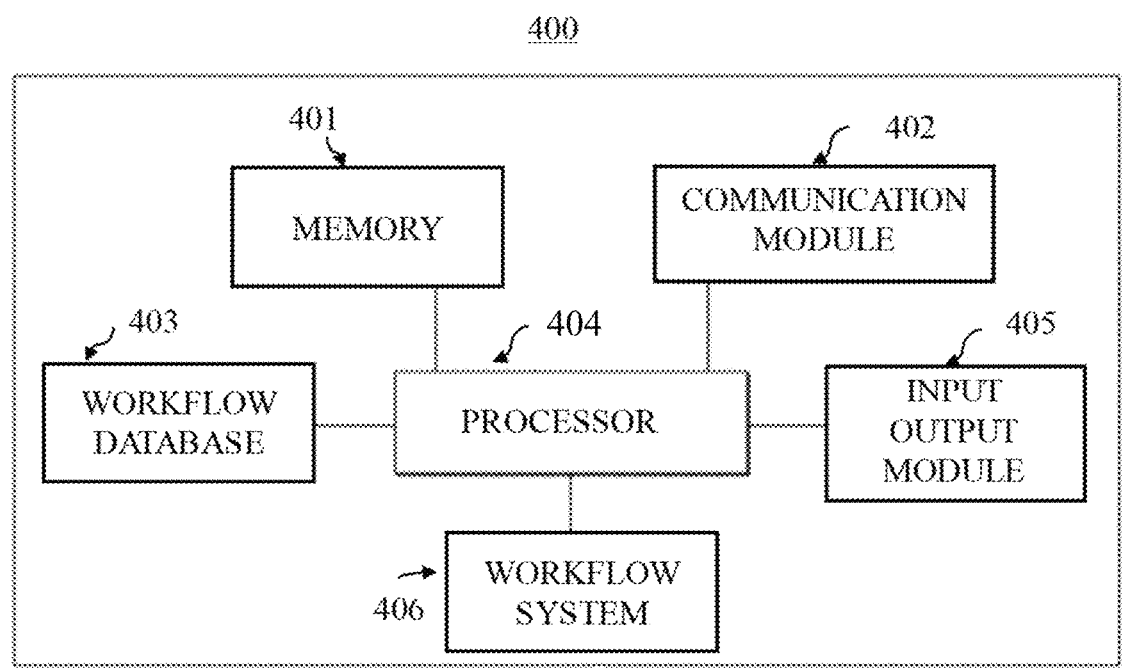
FIG. 4 illustrates a schematic block diagram of a workflow performance system according to an example embodiment.

FIG. 4 shows a schematic block diagram of circuitry 400, some or all of which may be included in, for example, the voice-controlled apparatus 101, the electronic device 102, the operator devices 103-103N, the supervisor device 106, and/or the server 105. Any of the aforementioned systems or devices may include the circuitry 400 and may be configured to, either independently or jointly with other devices in a network 120 perform the functions of the circuitry 400 described herein. As illustrated in FIG. 4, in accordance with some example embodiments, circuitry 400 can includes various means, such as memory 401, communications module 402, processor 404, and/or input/output module 405. In some embodiments, workflow database 403 and/or workflow system 406 may also or instead be included. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 401) that is executable by a suitably configured processing device (e.g., processor 404), or some combination thereof.

Processor 404 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments processor 404 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 404 is configured to execute instructions stored in memory 401 or otherwise accessible to processor 404. These instructions, when executed by processor 404, may cause circuitry 400 to perform one or more of the functionalities of circuitry 400 as described herein.

Whether configured by hardware, firmware/software methods, or by a combination thereof, processor 404 may comprise an entity capable of performing operations according to embodiments of the present invention while configured accordingly. Thus, for example, when processor 404 is embodied as an ASIC, FPGA or the like, processor 404 may comprise specifically configured hardware for conducting one or more operations described herein. Alternatively, as another example, when processor 404 is embodied as an executor of instructions, such as may be stored in memory 401, the instructions may specifically configure processor 404 to perform one or more algorithms and operations described herein, such as those discussed in connection with FIGS. 1-15.

Memory 401 may comprise, for example, volatile memory, non-volatile memory, or some combination thereof. Although illustrated in FIG. 4 as a single memory, memory 401 may comprise a plurality of memory components. The plurality of memory components may be embodied on a single computing device or distributed across a plurality of computing devices. In various embodiments, memory 401 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 401 may be configured to store information, data (including item data and/or profile data), applications, instructions, or the like for enabling circuitry 400 to carry out various functions in accordance with example embodiments of the present invention. For example, in at least some embodiments, memory 401 is configured to buffer input data for processing by processor 404. Additionally, or alternatively, in at least some embodiments, memory 401 is configured to store program instructions for execution by processor 404. Memory 401 may store information in the form of static and/or dynamic information. This stored information may be stored and/or used by circuitry 400 during the course of performing its functionalities.

Communication module 402 may be embodied as any device or means embodied in circuitry, hardware, a computer program product comprising computer readable program instructions stored on a computer readable medium (e.g., memory 401) and executed by a processing device (e.g., processor 404), or a combination thereof that is configured to receive and/or transmit data from/to another device and/or network, such as, for example, a second circuitry 400 and/or the like. In some embodiments, communication module 402 (like other components discussed herein) can be at least partially embodied as or otherwise controlled by processor 404. In this regard, communication module 402 may be in communication with processor 404, such as via a bus. Communication module 402 may include, for example, an antenna, a transmitter, a receiver, a transceiver, network interface card and/or supporting hardware and/or firmware/software for enabling communications with another computing device. Communication module 402 may be configured to receive and/or transmit any data that may be stored by memory 401 using any protocol that may be used for communications between computing devices. Communication module 402 may additionally or alternatively be in communication with the memory 401, input/output module 405 and/or any other component of circuitry 400, such as via a bus.

Input/output module 405 may be in communication with processor 404 to receive an indication of a user input and/or to provide an audible, visual, mechanical, or other output to a user (e.g., employee and/or customer). Some example visual outputs that may be provided to a user by circuitry 400 are discussed in connection with FIGS. 1-15. As such, input/output module 405 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 405 may be reduced as compared to embodiments where circuitry 400 is implemented as an end-user machine (e.g., remote worker device and/or employee device) or other type of device designed for complex user interactions. In some embodiments (like other components discussed herein), input/output module 405 may even be eliminated from circuitry 400. Alternatively, such as in embodiments wherein circuitry 400 is embodied as a server or database, at least some aspects of input/output module 405 may be embodied on an apparatus used by a user that is in communication with circuitry 400. Input/output module 405 may be in communication with the memory 401, communication module 402, and/or any other component(s), such as via a bus. One or more than one input/output module and/or another component can be included in circuitry 400.

The workflow database 403 and the workflow system 406 may also or instead be included and configured to perform the functionality discussed herein related to workflow and/or identifying performance status associated with an execution of the workflow. In some embodiments, some or all of the functionality of generating and/or information for workflow and/or performance status associated with execution of the workflow may be performed by processor 404. In this regard, the example processes and algorithms discussed herein can be performed by at least one processor 404, workflow database 403, and/or workflow system 406. For example, non-transitory computer readable media can be configured to store firmware, one or more application programs, and/or other software, which include instructions and other computer-readable program code portions that can be executed to control each processor (e.g., processor 404, workflow database 403, and/or workflow system 406) of the components of circuitry 400 to implement various operations, including the examples shown above. As such, a series of computer-readable program code portions are embodied in one or more computer program goods and can be used, with a computing device, server, and/or other programmable apparatus, to produce machine-implemented processes.

Figure 5:
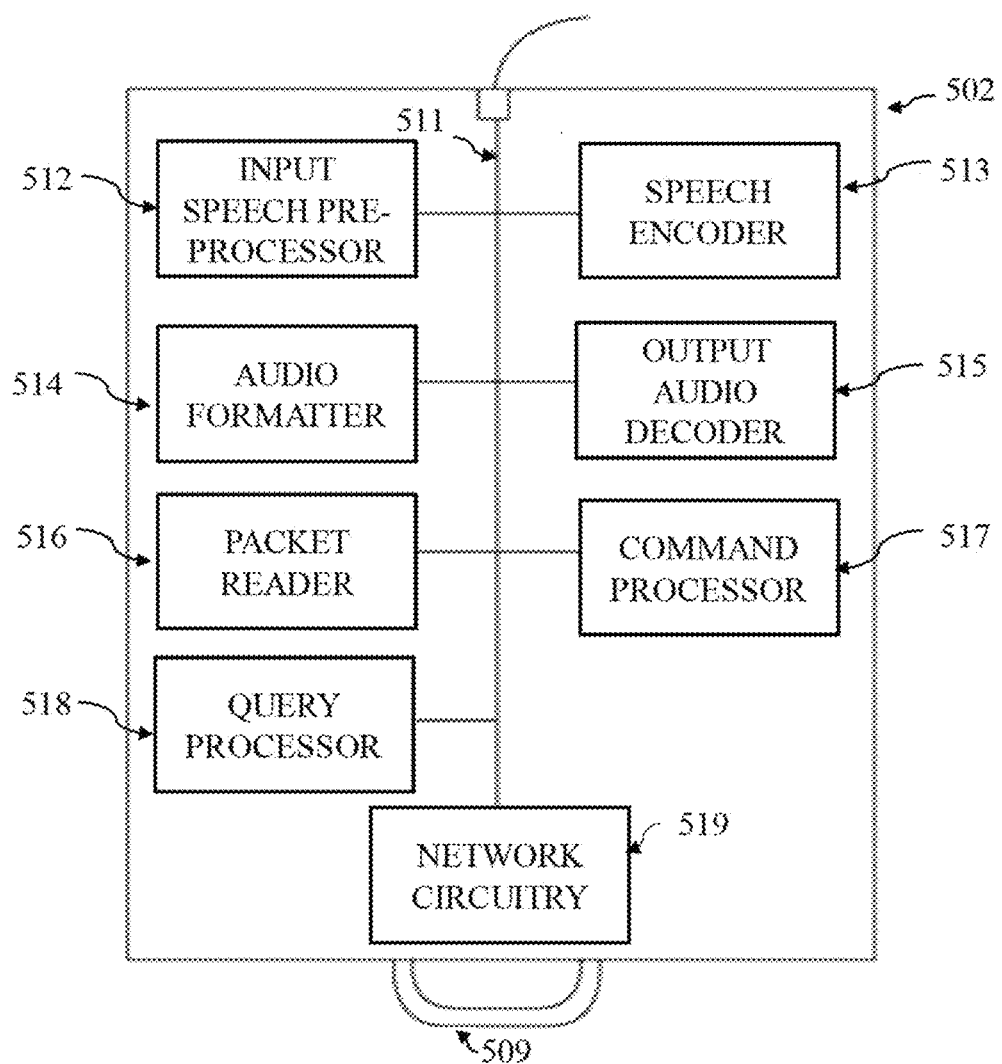
FIG. 5 illustrates a block diagram of the voice-controlled apparatus used for performing a workflow operation, in accordance with an example embodiment.

FIG. 5 illustrates an exemplary block diagram of an electronics module 502 in accordance with some embodiments of the present disclosure. The components illustrated in FIG. 5 may be in addition to one or more components of the circuitry 400 shown in FIG. 4, which may be part of the electronics module 502. In some embodiments, one or more of the components illustrated in FIG. 5 may be included in the electronics module 502 and/or other parts of the voice-controlled apparatus (200, 101), the electronic device 102, operator devices 103-103N, supervisor device 106, and/or server 105.

In the embodiment shown in FIG. 5, the electronics module 502 can include an enclosure, such as plastic case, with a connector that can mate with a complimentary mating connector (not shown) on audio cable 206 (as shown in FIG. 2). An internal path 511 can be used to communicate between multiple components within the electronics module 502 enclosure. The electronics module 502 can utilize a user-configurable attachment feature 509, such as a plastic loop and/or other suitable features, for at least partially facilitating attachment of the electronics module to the worker. In one embodiment, an input speech pre-processor (ISPP) 512 can convert input speech into pre-processed speech feature data. In some examples, an input speech encoder (ISENC) 513 can encode input speech for transmission to one or more other parts of circuitry 400 for reconstruction and playback and/or recording. Further, a raw input audio sample packet formatter 514 can transmit the raw input audio to one or more other parts of circuitry 400 using an application-layer protocol to facilitate communications between the voice terminal and headset 201 as the transport mechanism. For the purposes of the transport mechanism, the formatter 514 can be abstracted to a codec type referred to as Input Audio Sample Data (IASD). An output audio decoder (OADEC) 515 decodes encoded output speech and audio for playback in the headset 201. According to some example embodiments, a raw output audio sample packet reader 516 can operates to receive raw audio packets from one or more other parts of circuitry 400 using the transport mechanism. For the purposes of the transport mechanism, this formatter 514 can be abstracted to a codec type referred to as Output Audio Sample Data (OASD). A command processor 517 can adjusts the headset hardware (e.g., input hardware gain level) under control of one or more other parts of circuitry 400. Further, in some example embodiments, a query processor 518 can allow one or more other parts of circuitry 400 to retrieve information regarding headset operational status and configuration. Further, path 511 can also be coupled to network circuitry 519 to communicate via wired or wireless protocol with one or more other parts of circuitry 400. In some examples, the ISPP 512, ISENC 513, and raw input audio formatter 514 can be sources of communication packets used in the transport mechanism; the OADEC 515 and raw output audio reader 516 can be packet sinks. The command and query processors 517, 518 are both packet sinks as well as sources (in general they generate acknowledgement or response packets).

Figure 6:
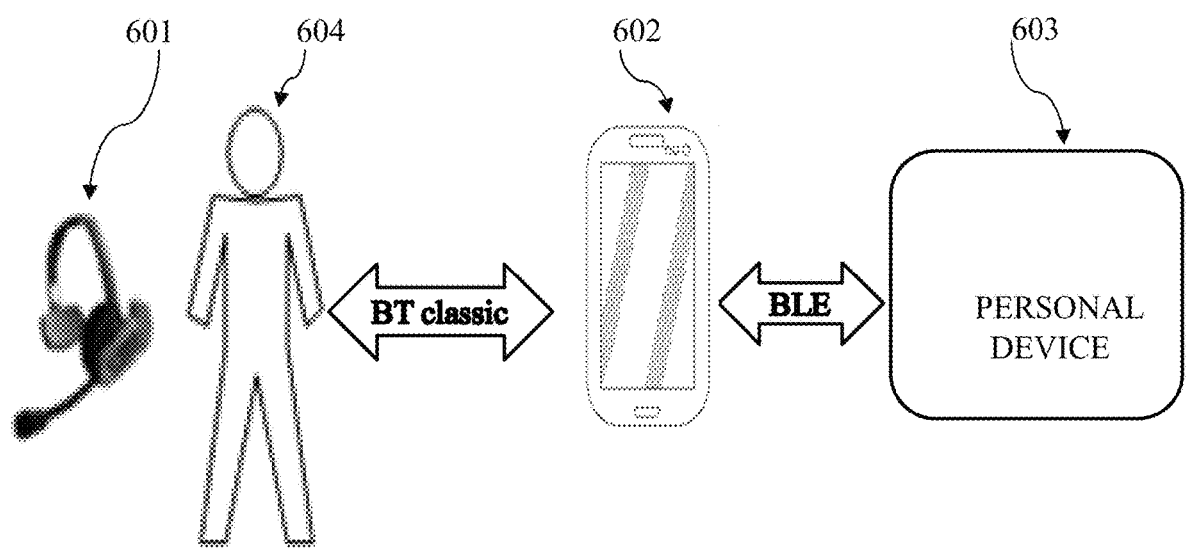
FIG. 6 illustrates an example scenario depicting a communication between an operator, a personal device and a voice-controllable apparatus, in accordance with an example embodiment.

FIG. 6 illustrates an example scenario of communication between a voice-controlled apparatus 601 (e.g. a headset device, a wearable head mounting device etc.) to be used by an operator 604, an electronic device 602 (e.g. a mobile device, a PDA etc.) and a personal device 603 (e.g. a personal mobile phone) carried by the operator 604. The voice-controlled apparatus 601, the electronic device 602 and the personal device 603 can be communicatively coupled to each other via a Bluetooth classic connection or BLE (Bluetooth Low Energy) protocol. In an example embodiment, the voice-controlled apparatus 601 can communicate with the electronic device 602 via a Bluetooth classic connection and the electronic device can communicate with the personal device 603 via a BLE protocol.

In accordance with the example embodiment, an operator 604 can use the voice-controlled apparatus 601 and the electronic device 602 to perform one or more tasks of the workflow operation. In an example embodiment, the workflow operation can be an item picking operation for picking one or more items, for example, from a storage location in the warehouse. In this regard, in an example embodiment, the operator 604 can wear the voice-controlled apparatus 601 (e.g. a headset device) and receive instructions in form of voice prompts from the electronic device 602 to perform various steps associated with the workflow operation. For example, the operator 604 can receive one or more voice prompts on the voice-controlled apparatus 601 that can include instructions (such as instructions for, reaching a storage location, identifying items to be picked, confirming the items for picking, and etc.) related to the picking of the items.

Figure 7:
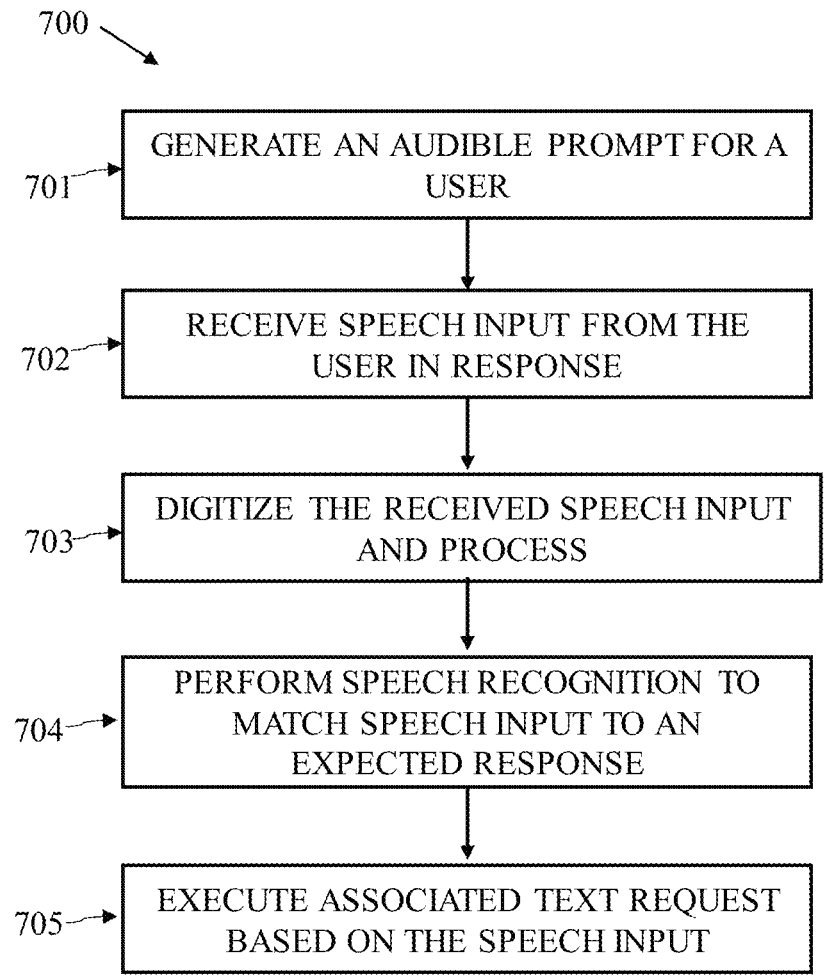
FIG. 7 shows a flowchart illustrating a method of utilizing voice-driven technology according to an example embodiment.

FIG. 7 illustrates an exemplary embodiment of a method 700 for providing voice-based communication and/or speech dialog between a user and an electronic device. The method 700 may include generating speech for a user 701. In an embodiment, the voice-controlled apparatus (for example, 200) can include output devices, such as, speakers for receiving digital instructions and/or commands from one or more components of the circuitry in the voice-controlled apparatus and output the audio transmission in the form of speech or sound.

The method 700 can further include receiving a speech input from a user in response 702. In accordance with one aspect of the present disclosure, the system can include a series of instances or junctures where an input is received from the user in response to the prompt. For example, a prompt asking a user for a desired location may request that a user provides an input, such as, speech input, providing location information, in accordance with the invention. In an example embodiment, the voice-controlled apparatus e, as described above, may further include input devices, such as a microphone for receiving speech inputs from a user. The microphone may further transmit the received speech input to one or more components of circuitry in the voice controllable device for further processing and recognition.

The method 700 can include digitizing the received speech input and processing digitized speech 703. In accordance with one aspect of the present disclosure, a microphone or other electro-acoustical components of the voice-controlled apparatus may receive a speech input from a user and may convert the speech input into an analog voltage signal.

The method 700 can further include performing speech recognition to match speech input to an expected response 704. In accordance with one aspect of the present disclosure, a speech recognition search algorithm function, realized by an appropriate circuit and/or software in the voice controllable device may analyze the features, as described above, to determine what hypothesis to assign to the speech input captured by the microphone of the voice-controlled apparatus. As is known in the art, in one recognition algorithm, the recognition search relies on probabilistic models provided through a database of suitable models to recognize the speech input. Each of the models in the database may either be customized to a user or be generic to a set of users.

Hidden Markov Models (HMM) may be used for the speech recognition. In speech recognition, these models may use sequences of states to describe vocabulary items, which may be words, phrases, or sub word units. As used herein, the term "word" may refer to a vocabulary item, and thus may mean a word, a segment or part of a word, or a compound word, such as "next slot" or "say again." Therefore, the term "word" may not be limited to just a single word. Each state in an HMI may represent one or more acoustic events and may serve to assign a probability to each observed feature vector. Accordingly, a path through the HMI states may produce a probabilistic indication of a series of acoustic feature vectors. The model may be searched such that different, competing hypotheses (or paths) are scored; a process known as acoustic matching or acoustic searching. A state S may be reached at a time T via a number of different paths. For each path reaching a particular state at a particular time, a path probability may be calculated. Using the Viterbi algorithm, each path through the HMI may be assigned a probability. In particular, the best path may be assigned a probability. Furthermore, each word in the best path may be assigned a probability. Each of these probabilities may be used as a confidence factor or combined with other measurements, estimates or numbers to derive a confidence factor. The path with the highest confidence factor, the best hypothesis, can then be further analyzed.

When in operation, the search algorithm (which can be implemented using Hidden Markov Models with a Viterbi algorithm or other modeling techniques such as template matching dynamic time warping (DTW) or neural networks), in essence, may compare the features generated, as described above, with reference representations of speech, or speech models, in the database in order to determine the word or words that best match the speech input from the user device. In an embodiment, part of this recognition process may be to assign a confidence factor for the speech to indicate how closely the sequence of features from the search algorithm matches the closest or best-matching models in the database. As such, a hypothesis consisting of one or more vocabulary items and associated confidence factors may be directed to an acceptance algorithm to determine expected response. In accordance with the above embodiment, if the confidence factor is above a predetermined acceptance threshold, then the acceptance algorithm may decide to accept the hypothesis as recognized speech. If, however, the confidence factor is not above the acceptance threshold, as utilized by the acceptance algorithm, then the acceptance algorithm may decide to ignore or reject the recognized speech. The user device may then prompt the user to repeat the speech input. In this instance, the user may repeat the audio input provided to the microphone.

The method 700 may further include executing the text request associated with the speech input 705. That is, a text request may be associated with the recognized speech and then acted upon after processing the speech input.

Figure 8:
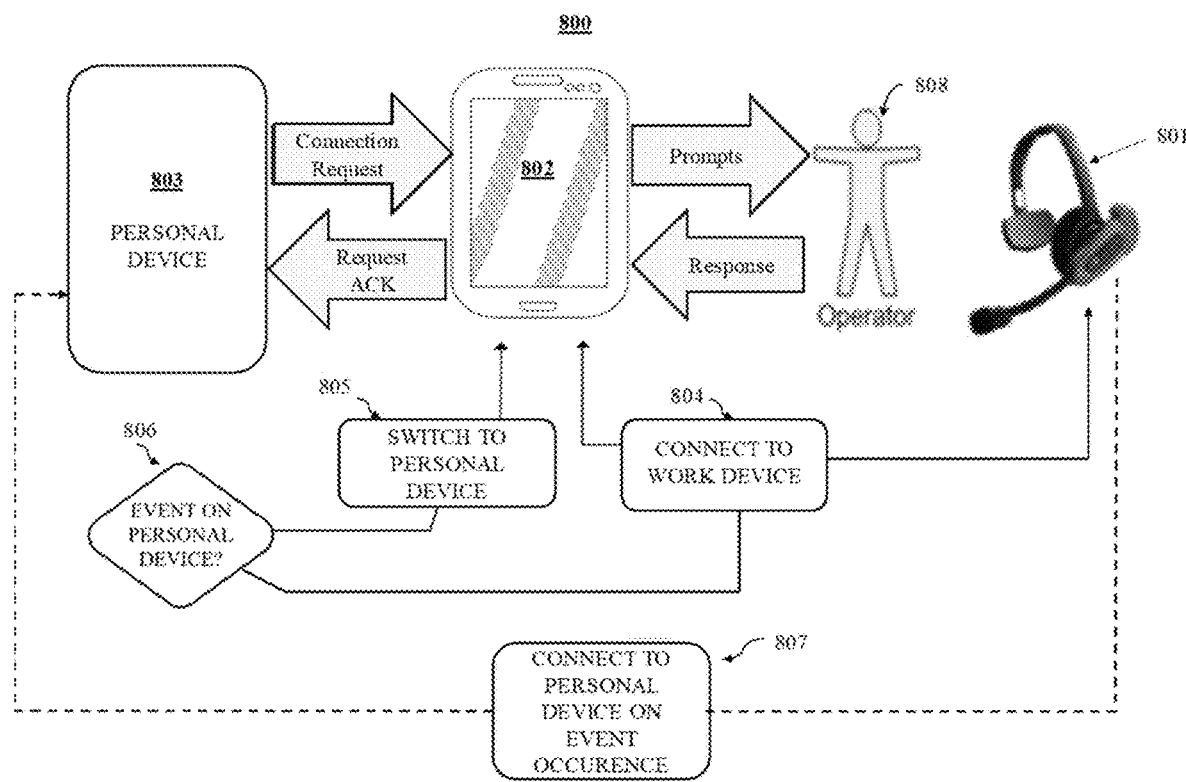
FIG. 8 illustrates an example scenario depicting a workflow operation performed by an operator, in accordance with an example embodiment.

FIG. 8 illustrates an example scenario of depicting a system 800 for workflow operation that can be performed by an operator 808, in accordance with an example embodiment. As illustrated, a work environment 800 can include the voice-controlled apparatus 801, and the electronic device 802 and the personal device 803. As described previously in reference to FIG. 1, the electronic device 102 and the voice-controlled apparatus 101 can correspond to a device (e.g. operator device 103-1 to 103N) that can be used by operators to perform the workflow operation.

In accordance with the example embodiment, an operator (e.g., 808) can use the voice-controlled apparatus 101 and the electronic device 102 to perform one or more tasks of the workflow operation. In an example, the workflow operation can be an item picking operation for picking one or more items, for example, from a storage location in the warehouse. In this regard, in an example embodiment, the operator 808 can wear the voice-controlled apparatus 101

(e.g. a headset device) and receive instructions in form of voice prompts from the electronic device 102 to perform various steps associated with the workflow operation. For example, the operator 808 can receive one or more voice prompts on the voice-controlled apparatus 101 that can include instructions (such as instruction for, reaching a storage location, identifying items to be picked, confirming the items for picking, etc.) related to the picking of the items. In other words, various steps of the workflow operation can be performed based on the voice dialogue (i.e. exchange of voice prompts and voice responses) between the operator 808 and the operator device.

As an example, as illustrated in FIG. 8, a voice dialogue can include multiple voice prompts that can be provided by the voice-controlled apparatus 801 (referred herein as, Talkman) to the operator 808 for performing steps of the workflow operation. In response to each voice prompt, the operator 808 can perform a task required at respective step and provide a voice response to the voice prompts. According to some examples, the voice response can be indicative of a performance or non-performance of the task instructed in the voice prompt. In some examples, the voice response can indicate any of, a confirmation, a data value, etc. indicative of performing of that step of the task of the workflow.

Also, as illustrated in FIG. 8, the personal device 803 can send out connection request signal to the electronic device 802 and receive request acknowledgment (ACK) from the electronic device 802.

According to the example embodiment, the voice-controlled apparatus 801 can connect to the electronic device 802 (referred herein as, a work device) at step 804, for performing tasks in a workflow operation. At step 805, the connection of the voice-controlled apparatus 801 can switch from the electronic device 802 to the personal device 803, upon occurrence of an event on personal device 803 (at step 806). At step 807, the voice controllable apparatus 801 can now establish a connection with the personal device while the connection with the electronic device 802 is discontinued. In other words, the connection between the voice controllable apparatus 801 and the electronic device 802 can be discontinued temporarily upon occurrence of the event on the personal device 803. In an example, the event may comprise an incoming call, a text message or a notification in the personal device 803. The operator 808 during the workflow execution can pick up the incoming call on the personal device 803 via the voice-controlled apparatus 801.

Figure 9:
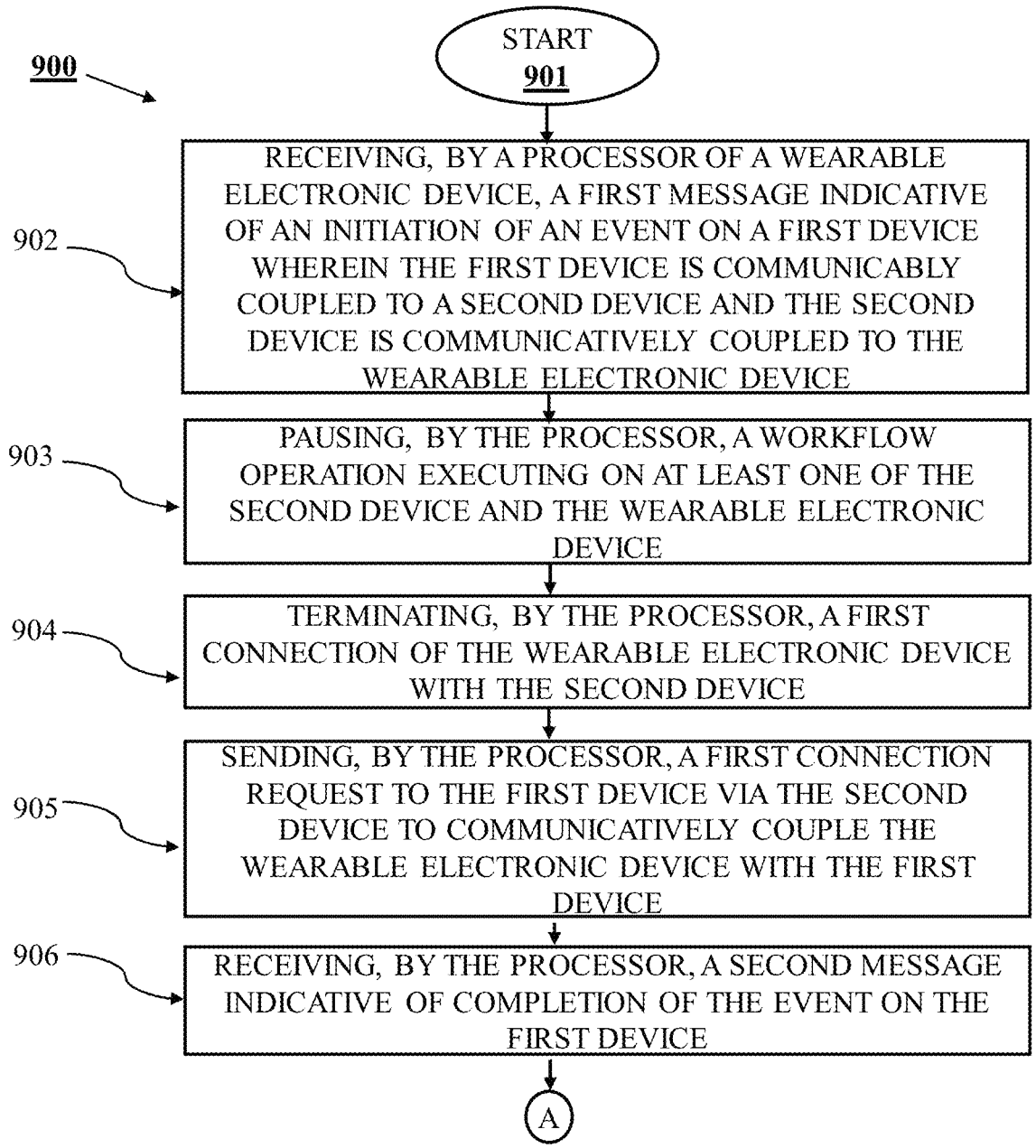
FIGS. 9-10 illustrate a flow diagram representing a method for establishing a communication between a voice-controllable apparatus, a first electronic device and a second electronic device based on event occurrence, in accordance with another example embodiment described herein.
Figure 10:
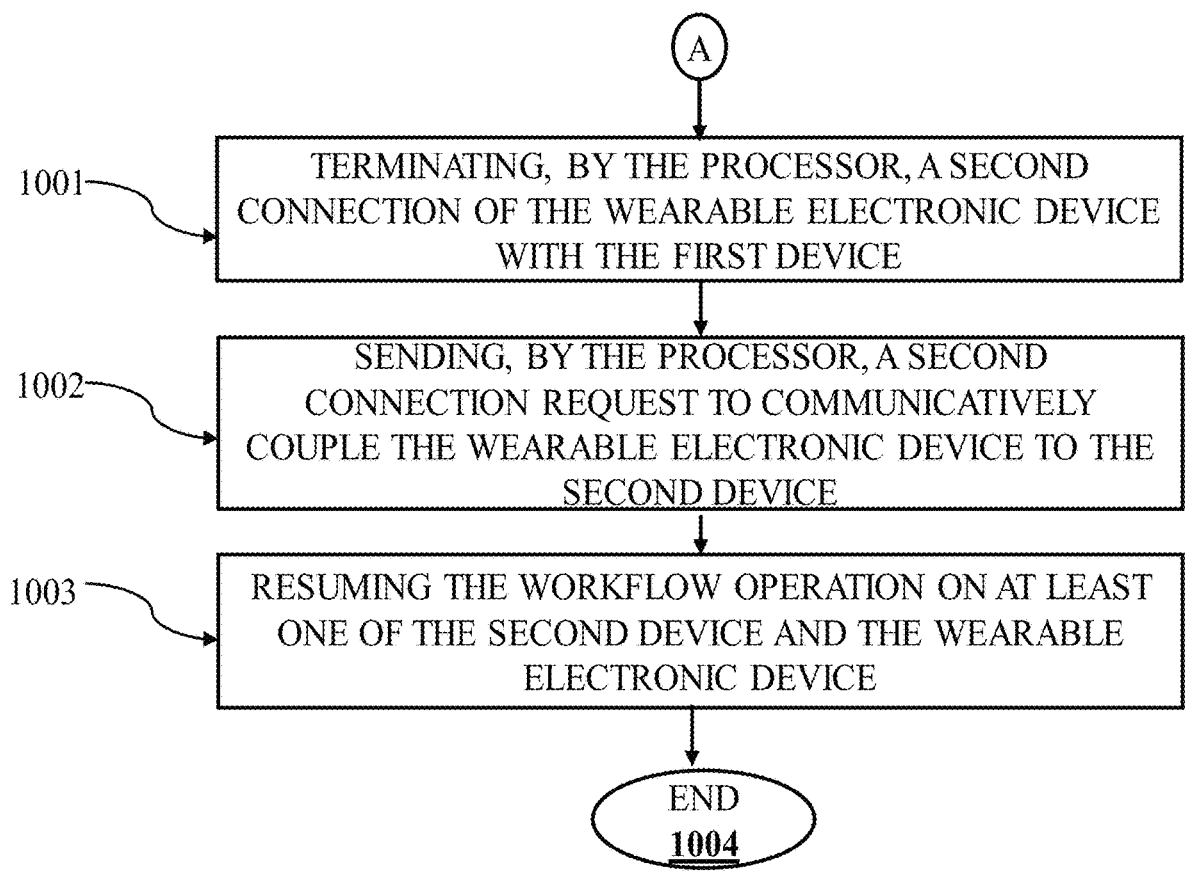

FIGS. 9-10 illustrates a flow diagram representing a method 900 for facilitating the worker to use the personal device while executing a workflow operation, in accordance with an example embodiment.

The method 900 starts at step 901. At step 902, a wearable electronic device (e.g. the voice-controlled apparatus 801) can receive a first message indicative of an initiation of an event on a first device. In this regard, as described earlier, an event referred herein can represent an incoming call, a text message or a notification received on the first device. The first device can communicate with a second device, via a BLE protocol, as described earlier in FIG. 6. In the same manner, the second device can communicate with the wearable electronic device, via a Bluetooth classic connection.

At step 903, the wearable electronic device can pause the workflow operation executing on at least one of the second device and the wearable electronic device. In an example, as described in FIG. 8, the workflow operation can be an item picking operation for picking one or more items, from a storage location in the warehouse.

At step 904, in response to pausing the workflow operation, the wearable electronic device can terminate a first connection between the wearable electronic device with the second device.

The method at step 905 illustrates that the wearable electronic device can send a first connection request to the first device via the second device, to couple the wearable electronic device with the first device.

At step 906, the wearable electronic device can receive a second message indicative of completion of the event on the first device. According to some example embodiments, the completion of the event on the first device can represent incoming call end STATE, i.e. may indicate that the incoming call on the first device ended. The processing control can be then transferred to step 1001, as shown in FIG. 10.

At step 1001, in response to the completion of the event on the first device, the wearable electronic device can terminate a second connection of the wearable electronic device with the first device.

At step 1002, the wearable electronic device can send a second connection request to communicatively couple the wearable electronic device to the second device.

At step 1003, the wearable electronic device can resume the workflow operation on at least one of the second device and the wearable electronic device. The method 900 stops at step 1004.

Figure 11:
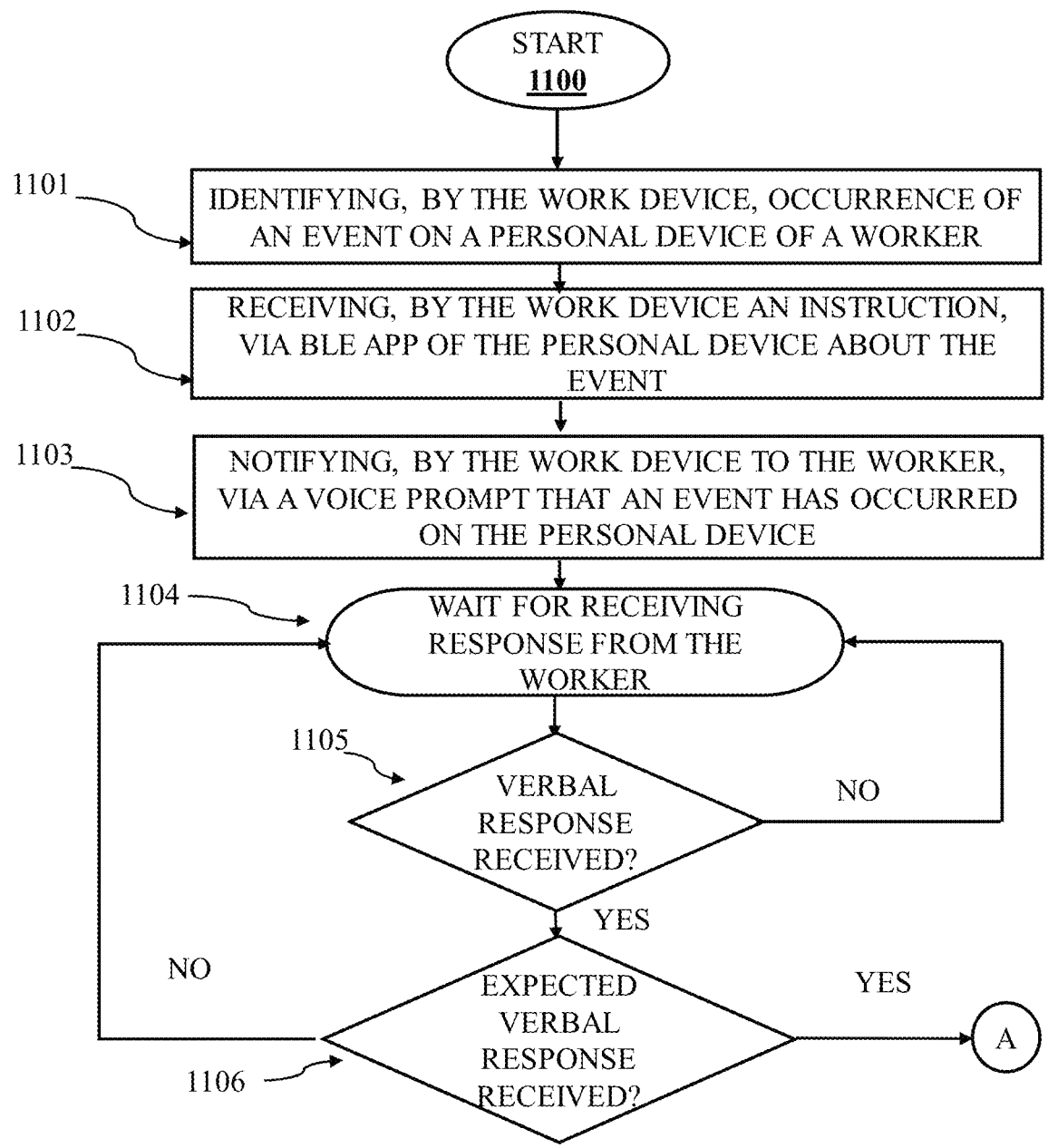
FIGS. 11-13 illustrate a flow chart representing a method for utilizing a voice-controllable apparatus for executing a workflow operation as well as attending a call event occurred in the personal device, in accordance with an example embodiment
Figure 12:
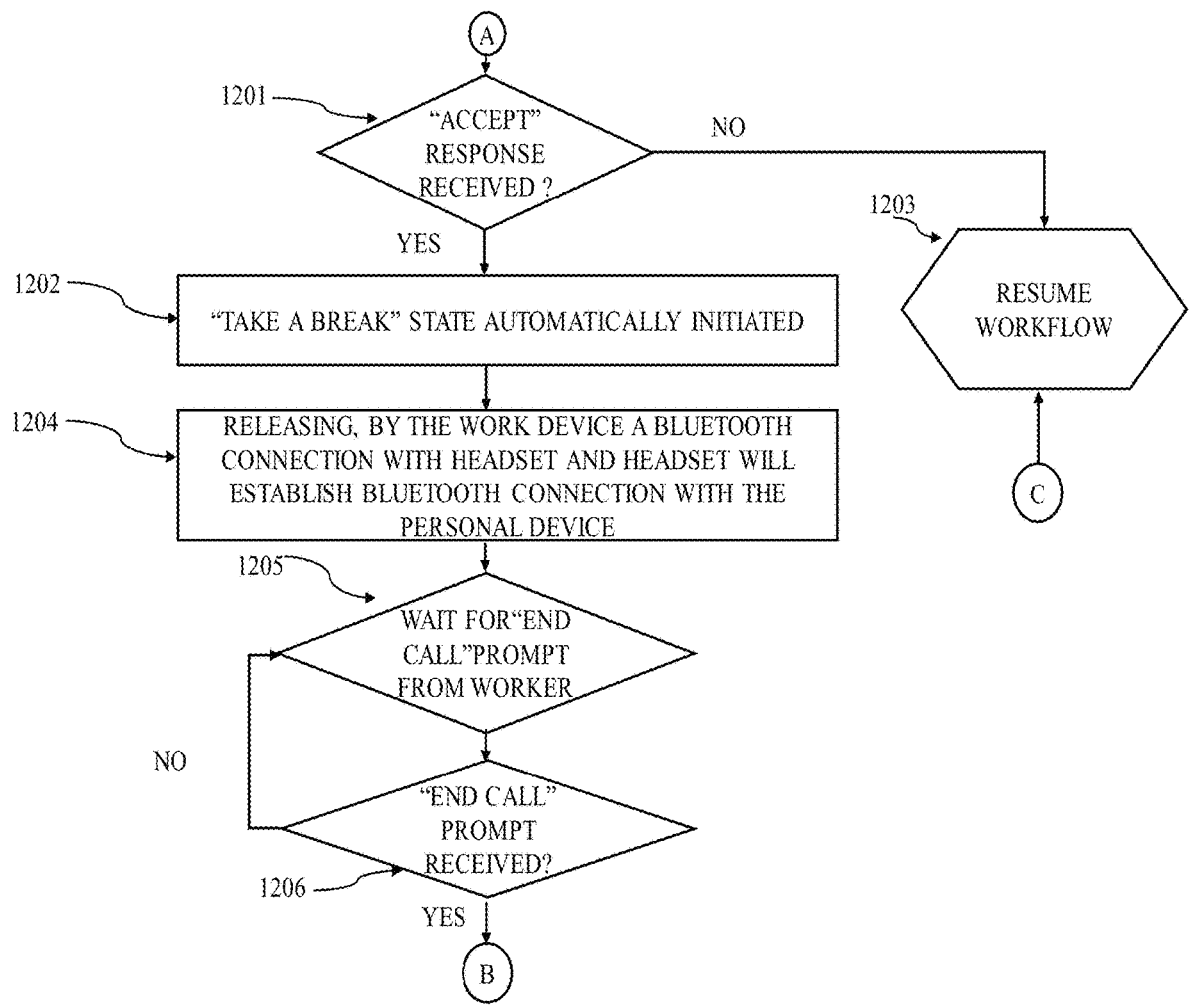
Figure 13:
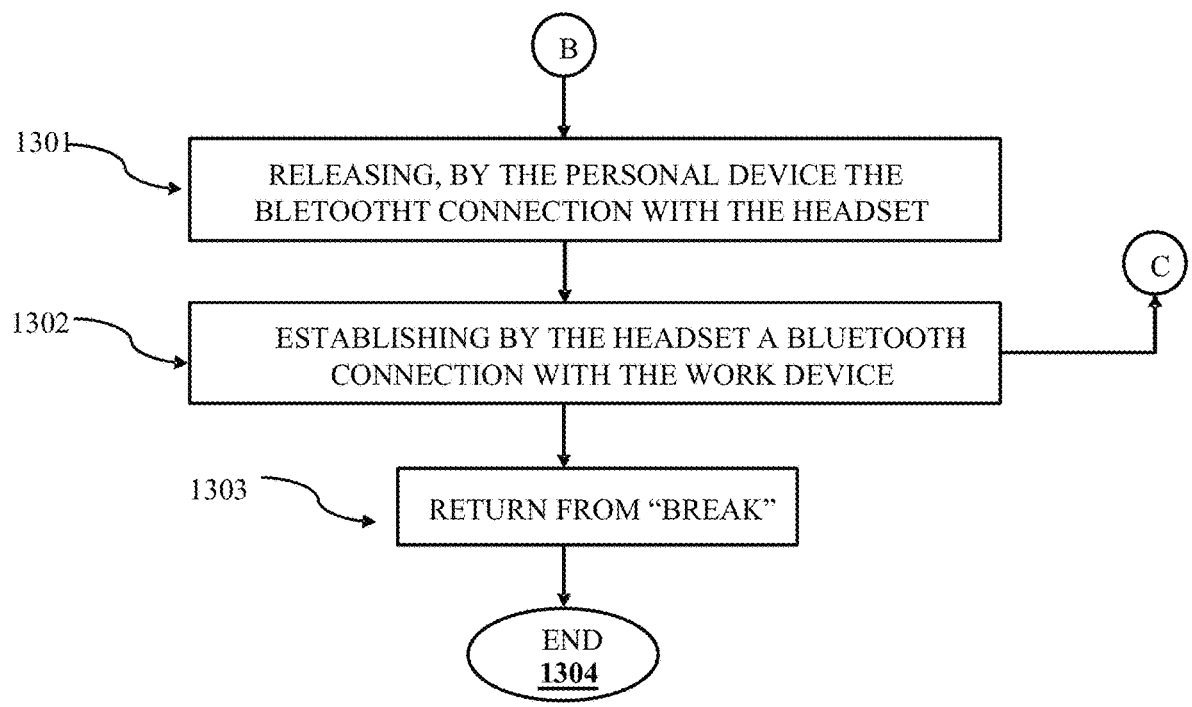

In an example embodiment, FIGS. 11-13 illustrate a flow or block diagram of a method of workflow operations performed by the system 800. The process starts at block 1100. At block 1101, a work device (for example, Dolphin CT50 Handheld computer) can identify occurrence of an event on a personal device of a worker. In an example, the work device can have a persistent connection with the personal device of the worker. The connection can comprise a continuous transmission of packets between the work device and the personal device. As already described earlier in FIG. 8, the event can include, for example, an incoming call, a text message or a notification in the personal device. The personal device of the worker can have an application (for example, Vocollect BLE app) stored in a memory of a processor that could facilitate a communication between the work device and the personal device.

In an example embodiment, when an incoming call is received on the personal device, the application stored in the processor of the personal device can send instructions to the work device over a BLE protocol, as already discussed in FIG. 6. At block 1102, the work device can receive the instruction from the personal device indicating occurrence of the incoming call on the personal device.

At block 1103, the work device can further notify the worker via a voice prompt that an event has occurred on the personal device. In this regard, the voice prompt can be received by an input/output module 405 of a user device 200, as shown in FIGS. 2 and 4. In accordance with an exemplary embodiment, with reference to FIG. 2, the voice prompt can be received by a speaker 202 of a user device 200. The notification to the worker may not be limited to voice but can comprise a visual notification on a display of the work device. After the provision of the voice prompt at block 1103, processing control can be transferred to block 1104.

At block 1104, the work device waits till it receives a verbal response from the worker. By a way of an example, the verbal response can include "Accept", "Reject", to accept or reject the incoming call on the personal device. The verbal response can be provided via a microphone (for example, microphone 203 shown in FIG. 2) of the user device 200. The verbal response can also include predetermined phrases, and/or may include any speech signal input which can be parsed and recognized by a speech circuitry. In response to receiving a verbal response from the worker, at block 1105, such as within a predetermined timeframe, processing control can be transferred from block 1105 to block 1106. In case, no response is received within the predetermined timeframe, the processing control can be transferred back to block 1104.

At step 1106, the system 800 described in FIG. 8, can check if the verbal response received from the worker is appropriate or expected. As discussed above, the verbal response can include phrases like "Accept" or "Reject" which may be parsed and recognized by the speech circuitry. In response to receiving an expected verbal response from the worker, the processing control can be transferred to block 1201, or otherwise transferred to block 1104 if the verbal response received is not the expected one.

At step 1201, the system can check if the verbal response received from the worker comprises "Accept" phrase. As another example and at least partially reiterating from above, an appropriate verbal response associated with block 1201 can be a verbal response from the worker comprising one or more of the words "Accept," "Okay," and/or any other suitable verbal verification for indicating that the worker is ready to attend the incoming call. In other words, the worker may want to accept the incoming call.

In response to receiving the expected verbal response comprising "Accept" or similar phrase, worker's break period can be initiated, at block 1202. In an example embodiment, in order to indicate the beginning of a break activity the worker can also report through the headset using standard break vocabulary such as "take a break" followed by the type of break the worker wishes to take (e.g., lunch break, coffee break, phone call break, etc.). Determining worker idle duration around reported break activities can be useful information for a supervisor because workers may generally cease or slow work activity before reporting break activities and/or after reporting returning from break activities. In response to a negative determination being made at block 1201, processing control can be transferred to block 1203 to resume the workflow operation. In an example embodiment, suppose if the verbal response from the worker comprises phrase "Reject" indicating that the worker is not ready to take the call, the workflow can resume from paused state.

In response to initiation of break period of the worker, the work device at block 1204 can release a connection, such as Bluetooth classic connection, with the headset (for example, 601), as shown in FIG. 6. In accordance with an exemplary embodiment, with reference to FIG. 8, after termination of connection between the headset (refer as voice-controlled apparatus 801) and the work device (refer as electronic device 802), the headset can establish a connection with the personal device 803. In simple words, the connection of the headset 801 may switch from the work device 802 to the personal device 803. In this regard, the worker 808 can pick up the incoming call in the personal device 803 via the headset 801 without a need to terminate the workflow execution.

At block 1205, the work device waits till it receives a verbal command from the worker. By a way of an example, the verbal command can include phrases like "End call" or "Vocollect end call", to end the incoming call. The verbal command can be provided via a microphone (for example, microphone 203 shown in FIG. 2) of the user device 200. The verbal response can include pre-determined phrases, and/or may include any speech signal input which can be parsed and recognized by a speech circuitry. In response to receiving a "End call" verbal command from the worker, at block 1206, such as within a predetermined timeframe, processing control can be transferred from block 1206 to block 1301. In response to negative determination at block 1206, the processing control can be transferred to block 1205.

At block 1301, the personal device can release a connection, such as Bluetooth classic connection, with the headset (for example, 601), as shown in FIG. 6. In response to releasing the connection with the personal device, the headset re-establishes the connection with the work device, at block 1302. In other words, the connection of the headset 801 can switch from the personal device 803 to the work device 802. Processing control can be transferred from block 1302 to block 1203, thereby, resuming the workflow operation.

At block 1303, the break period of the worker can be terminated by the system.

At block 1304, the process ends. In the method described above, the provision of each of the numerous verbal prompts (e.g., at blocks 1103) can comprise the speaker 202 converting or transforming an audio signal, which is provided by respective features of the system 200, to a voice-sound for being received by the worker; and the receipt of each of the verbal responses (e.g., as a precursor to blocks 1105, 1201 and/or 1205) can comprise the microphone 203 converting or transforming a voice sound, which is provided by the worker, to an electrical signal that is provided to respective features of the system 200.

Figure 14:
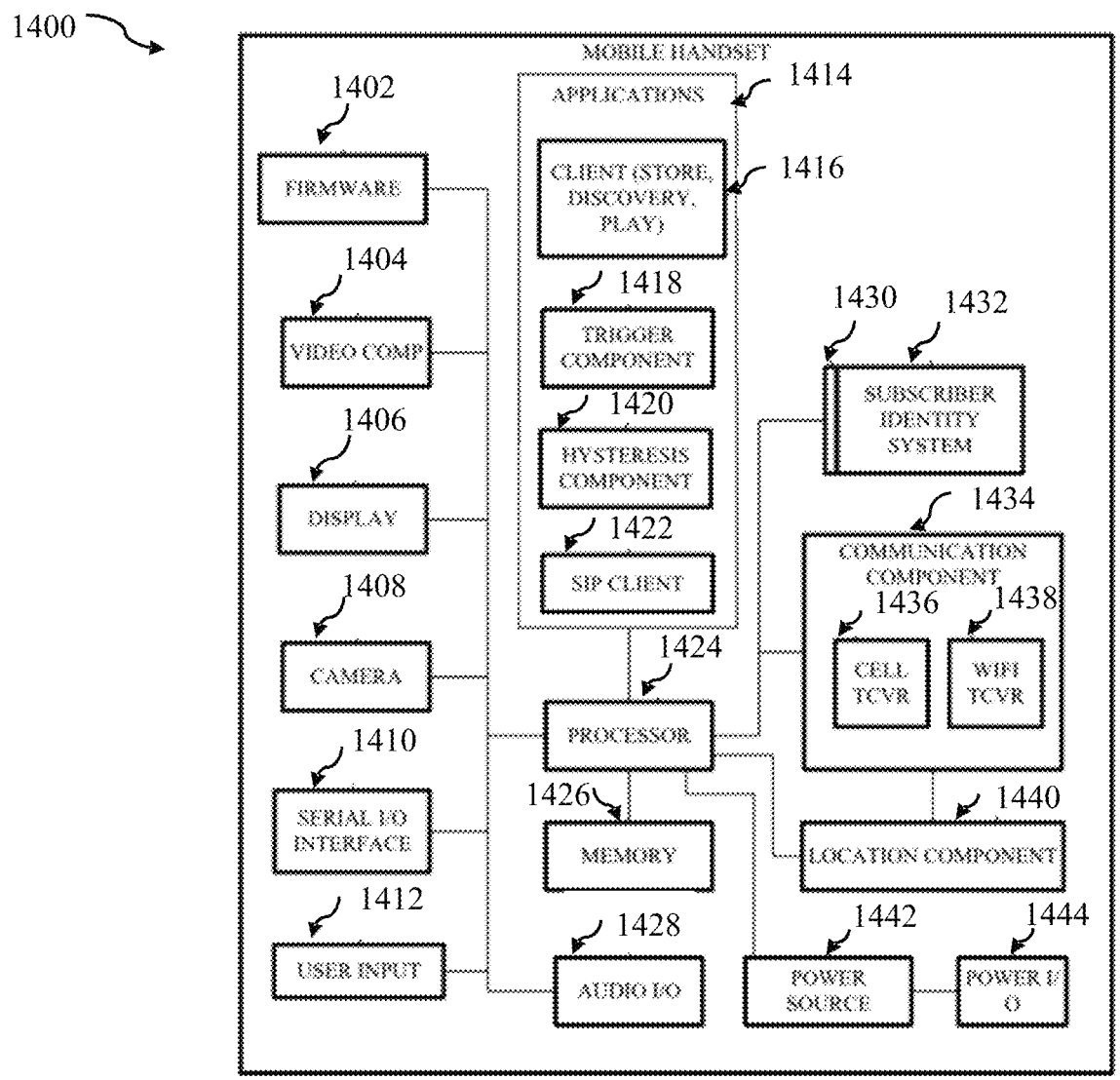
FIG. 14 illustrates a schematic view of an example electronic device used for performing a workflow operation, in accordance with an example embodiment.

FIG. 14 illustrates a schematic view 1400 of an example electronic device (e.g. the electronic device 102, the operator devices 103-103N, the supervisor device 106 etc.), in accordance with an example embodiment described herein. In some example embodiments, the electronic device 102 can correspond to a mobile handset. FIG. 14 illustrates is a schematic block diagram of an example end-user device such as a user equipment that can be the electronic device 102 used by an operator for executing one or more tasks of a workflow.

Although, FIG. 14 illustrates a mobile handset, it will be understood that other devices can be any electronic device as described in FIG. 1, and that the mobile handset is merely illustrated to provide context for the embodiments of the various embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the electronic device 102, the operator devices 103-103N, and the voice-controlled apparatus 101 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the mobile handset can comprise a processor 1424 for controlling and processing all onboard operations and functions. A memory 1426 interfaces to the processor 1424 for storage of data and one or more applications 1414 (e.g., a video player software, user feedback component software, etc.). Other applications can include voice recognition of predetermined voice commands that facilitate initiation of the user feedback signals. The applications 1414 can be stored in the memory 1426 and/or in a firmware 1402 and executed by the processor 1424 from either or both the memory 1426 or/and the firmware 1402. The firmware 1402 can also store startup code for execution in initializing the mobile handset. A communications component 1434 interfaces to the processor 1424 to facilitate wired/wireless communication with external systems, e.g., cellular networks, VoIP networks, and so on. Here, the communications component 1434 can also include a suitable cellular transceiver 1436 (e.g., a GSM transceiver) and/or an unlicensed transceiver 1438 (e.g., Wi-Fi, WiMAX) for corresponding signal communications. The mobile handset can be a device such as a cellular telephone, a PDA with mobile communications capabilities, and messaging-centric devices. The communications component 1434 also facilitates communications reception from terrestrial radio networks (e.g., broadcast), digital satellite radio networks, and Internet-based radio services networks.

The mobile handset can also comprise a display 1406 (e.g. display screen) for displaying text, images, video, telephony functions (e.g., a Caller ID function), setup functions, and for user input. For example, the display 1406 can also be referred to as a "screen" that can accommodate the presentation of multimedia content (e.g., music metadata, messages, wallpaper, graphics, etc.). The display 1406 can also display videos and can facilitate the generation, editing and sharing of video quotes. A serial I/O interface 1410 is provided in communication with the processor 1424 to facilitate wired and/or wireless serial communications (e.g., USB, and/or IEEE 1384) through a hardwire connection, and other serial input devices (e.g., a keyboard, keypad, and mouse). This support updating and troubleshooting the mobile handset, for example. Audio capabilities are provided with an audio I/O component 1428, which can include a speaker for the output of audio signals related to, for example, indication that the user pressed the proper key or key combination to initiate the user feedback signal. The audio I/O component 1428 also facilitates the input of audio signals through a microphone to record data and/or telephony voice data, and for inputting voice signals for telephone conversations.

The mobile handset can also comprise a slot interface 1430 for accommodating a SIC (Subscriber Identity Component) in the form factor of a card Subscriber Identity Module (SIM) or universal SIM 1432 and interfacing the SIM card 1432 with the processor 1424. However, it is to be appreciated that the SIM card 1432 can be manufactured into the mobile handset and updated by downloading data and software.

The mobile handset can also process IP data traffic through the communication component 1434 to accommodate IP traffic from an IP network such as, for example, the Internet, a corporate intranet, a home network, a person area network, etc., through an ISP or broadband cable provider. Thus, VoIP traffic can be utilized by the mobile handset and IP-based multimedia content can be received in either an encoded or decoded format.

A video processing component 1408 (e.g., a camera) can be provided for decoding encoded multimedia content. The video processing component 1408 can aid in facilitating the generation, editing and sharing of video quotes. The mobile handset also includes a power source 1442 in the form of batteries and/or an AC power subsystem, which power source 1442 can interface to an external power system or charging equipment (not shown) by a power I/O component 1444.

According to some example embodiments, the mobile handset can also comprise a video component 1404 for processing video content received and, for recording and transmitting video content. For example, the video component 1404 can facilitate the generation, editing and sharing of video quotes. In some example embodiments, a location tracking component 1440 facilitates geographically locating the mobile handset. As described hereinabove, this can occur when the user initiates the feedback signal automatically or manually. According to some example embodiments, a user input component 1412 facilitates the user initiating the quality feedback signal. In this regard, in some examples, the user input component 1412 can also facilitate the generation, editing and sharing of video quotes. According to various example embodiments described herein, the user input component 1412 can include such conventional input device technologies such as a keypad, keyboard, mouse, stylus pen, and/or touch screen, for example.

Referring again to the applications 1414, a hysteresis component 1420 can facilitate the analysis and processing of hysteresis data, which is utilized to determine when to associate with the access point. A software trigger component 1418 can be provided that facilitates triggering of the hysteresis component 1420 when the Wi-Fi transceiver 1438 detects the beacon of the access point. A SIP client 1422 enables the mobile handset to support SIP protocols and register the subscriber with the SIP registrar server. In some example embodiments, the applications 1414 can also include a client 1416 that provides at least the capability of discovery, play and store of multimedia content, for example, music.

In some example embodiments, the mobile handset, as indicated above related to the communications component 1434, includes an indoor network radio transceiver 1438 (e.g., Wi-Fi transceiver). This function can support the indoor radio link, such as IEEE 802.11, for the dual-mode GSM handset. In some example embodiments, the mobile handset can accommodate at least satellite radio services through a handset that can combine wireless voice and digital radio chipsets into a single handheld device.

Figure 15:
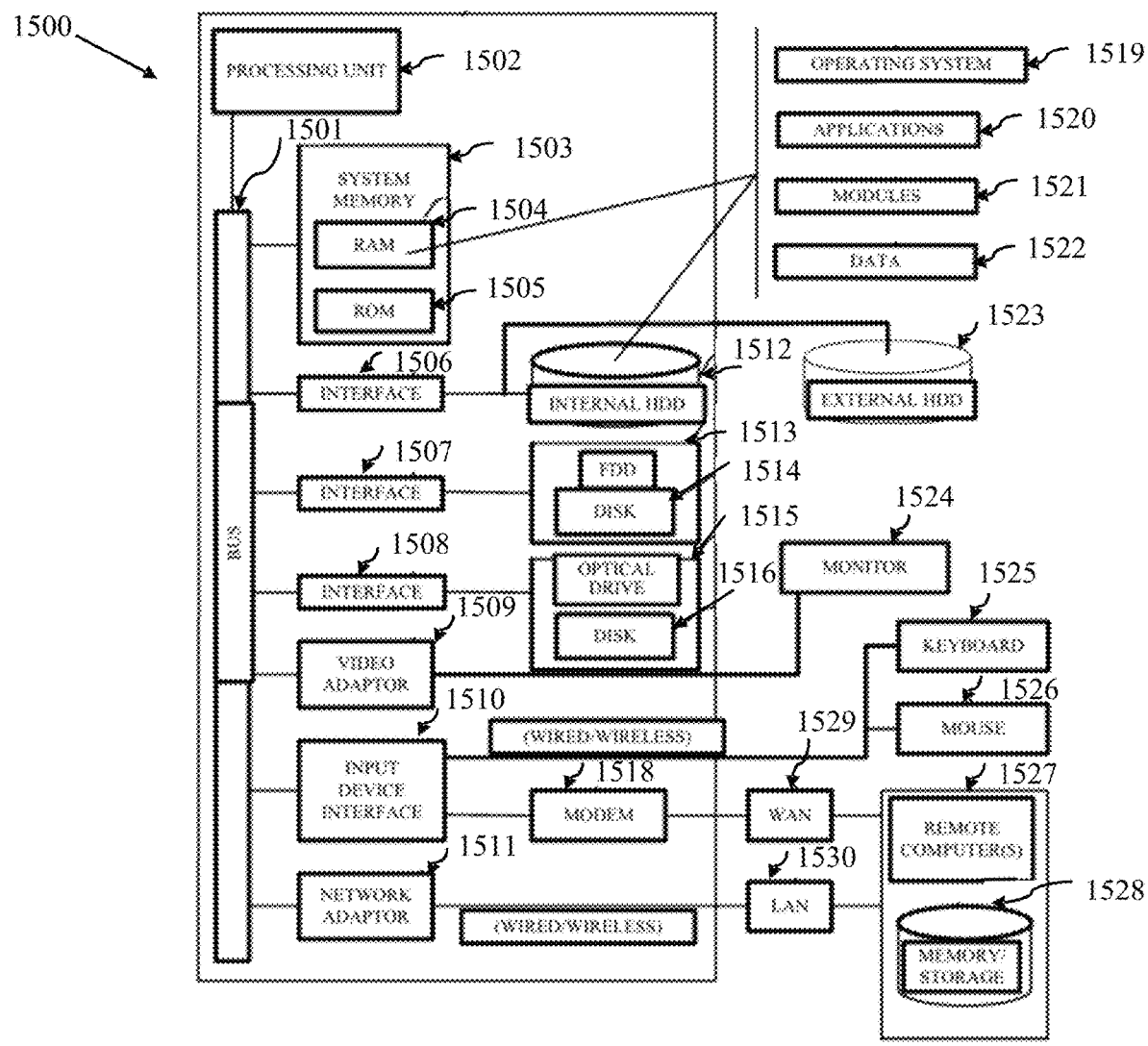
FIG. 15 illustrates a schematic view of another example electronic device used for performing a workflow operation, in accordance with another example embodiment.

FIG. 15 illustrates a schematic view of another example of an electronic device 1500, in accordance with another example embodiment described herein. According to some example embodiments, the electronic device 1500 illustrated in FIG. 15 can correspond to the electronic device 102, the operator devices 103-103N, the supervisor device 106, and/or the server 105, as described in reference to FIGS. 1-14.

Referring now to FIG. 15, there is illustrated a block diagram of operable to execute the functions and operations performed in the described example embodiments. In some example embodiments, the electronic device 1500 can provide networking and communication capabilities between a wired or wireless communication network and a server and/or communication device. In order to provide additional context for various aspects thereof, FIG. 15 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to the end-user device can comprise the electronic device (or referred as computing device 1500) comprising a processing unit 1502, a system memory 1503 and a system bus 1501. The system bus 1501 can be configured to couple system components including, but not limited to, the system memory 1503 to the processing unit 1502. In some example embodiments, the processing unit 1502 can be any of various commercially available processors. To this end, in some examples, dual microprocessors and other multi-processor architectures can also be employed as the processing unit 1502.

According to some example embodiments, the system bus 1501 can be any of several types of bus structure that can further interconnect to a memory bus (with or without a memory controller), a peripheral bus, and a local bus using any of a variety of commercially available bus architectures. In some examples, the system memory 1503 can comprise, read-only memory (ROM) 1505 and random-access memory (RAM) 1504. According to some example embodiments, a basic input/output system (BIOS) is stored in a non-volatile memory 1505 such as ROM, EPROM, EEPROM, which BIOS contains the basic routines that help to transfer information between elements within the computing device 1500, such as during start-up. The RAM 1504 can also comprise a high-speed RAM such as static RAM for caching data.

According to some example embodiments, the computing device 1500 can further comprise an internal hard disk drive (HDD) 1512 (e.g., EIDE, SATA), which internal hard disk drive 1512 can also be configured for external use in a suitable chassis (not shown), a magnetic floppy disk drive (FDD) 1513, (e.g., to read from or write to a removable diskette 1514) and an optical disk drive 1515, (e.g., reading a CD-ROM disk or, to read from or write to other high capacity optical media such as the DVD). In some examples, the hard disk drive 1512, magnetic disk drive 1513 and optical disk drive 1515 can be connected to the system bus 1501 by a hard disk drive interface 1506, a magnetic disk drive interface 1507 and an optical drive interface 1508, respectively. According to some example embodiments, the interface 1506 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 1504, including an operating system 1519, one or more application programs 1520, other program modules 1521 and program data 1522. To this end, in some examples, all or portions of the operating system, applications, modules, and/or data can also be cached in the RAM 1504. It is to be appreciated that the various embodiments can be implemented with various commercially available operating systems or combinations of operating systems.

According to some example embodiments, a user can enter commands and information into the computing device through one or more wired/wireless input devices, e.g., a keyboard 1525 and a pointing device, such as a mouse 1526. Other input devices (not shown) may include a microphone, an IR remote control, a joystick, a game pad, a stylus pen, touch screen, or the like. In some examples, these and other input devices are often connected to the processing unit 1502 through an input device interface 1510 that is coupled to the system bus 1501, but can be connected by other interfaces, such as a parallel port, an IEEE 1384 serial port, a game port, a USB port, an IR interface, etc.

According to some example embodiments, a monitor 1524 or other type of display device can also be connected to the system bus 1501 through an interface, such as a video adapter 1509. In addition to the monitor 1524, the computing device 1500 can also comprise other peripheral output devices (not shown), such as speakers, printers, etc.

According to some example embodiments, the computing device 1500 can operate in a networked environment using logical connections by wired and/or wireless communications to one or more remote computers, such as a remote computer(s) 1527. In some examples, the remote computer(s) 1527 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1528 is illustrated. According to some example embodiments, the logical connections depicted include wired/wireless connectivity to a local area network (LAN) 1530 and/or larger networks, e.g., a wide area network (WAN) 1529. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 1500 can be connected to the LAN 1530 through a wired and/or wireless communication network interface or adapter 1511. The adapter 1511 may facilitate wired or wireless communication to the LAN 1530, which may also include a wireless access point disposed thereon for communicating with the wireless adapter 1511.

In alternate examples, when used in a WAN networking environment, the computing device 1500 can include a modem 1518, or can be connected to a communications server on the WAN 1529 or has other means for establishing communications over the WAN 1529, such as by way of the Internet. The modem 1518, which can be internal or external and a wired or wireless device, is connected to the system bus 1501 through the input device interface 1510. In a networked environment, program modules depicted relative to the computer, or portions thereof, can be stored in the remote memory/storage device 1528. It will be appreciated that the network connections shown are exemplary and other means of establishing a communications link between the computers can be used.

According to some example embodiments, the computing device 1500 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method comprising:
receiving, by a processor of a wearable electronic device, a first message indicative of an initiation of an event on a first device, wherein the first device is communicably coupled to a second device and the second device is communicatively coupled to the wearable electronic device;
in response to receiving the first message indicating occurrence of the event on the first device, pausing, by the processor, a workflow operation executing on at least one of the second device and the wearable electronic device, wherein the workflow operation comprises one or more steps performable by an operator in a work environment,
receiving, by the processor, a first disconnection request from the second device, wherein the first disconnection request is to terminate a first connection of the wearable electronic device with the second device;
in response to receiving the first disconnection request, sending, by the processor, a first connection request to communicatively couple the wearable electronic device with the first device;
receiving, by the processor, a second message indicative of completion of the event on the first device;
receiving, by the processor, a second disconnection request from the first device, wherein the second disconnection request is to terminate a second connection of the wearable electronic device with the first device;
sending, by the processor, a second connection request to communicatively couple the wearable electronic device to the second device; and
resuming the workflow operation on at least one of the second device and the wearable electronic device.

2. The method of claim 1, wherein the event corresponds to an incoming call request on the first device.

3. The method of claim 1, wherein the first connection request and the second connection request correspond to a Bluetooth classic connection request.

4. The method of claim 1, wherein resuming the workflow operation comprises restarting the workflow operation from a step where the workflow operation was paused.

5. The method of claim 1, wherein the first device communicates to the second device via a Bluetooth low energy protocol.

6. The method of claim 2, wherein in response to the occurrence of the event on the first device, receiving a first prompt from a worker indicating acceptance of the incoming call request.

7. The method of claim 1, further comprising:
establishing, by the processor, the second connection between the wearable electronic device and the first device in response to receiving a first prompt from a worker, wherein the first prompt indicates acceptance of an incoming call request.

8. The method of claim 1, further comprising:
generating, by the processor, a voice notification indicative of reception of an incoming call request on the first device.

9. The method of claim 1, wherein the second connection of the wearable electronic device with the first device is terminated in response to receiving, a second prompt from a worker indicating end call request.

10. A method comprising:
transmitting, by a processor of a work device, a workflow execution command to a first device communicatively coupled to the work device, wherein the workflow execution command is to output a task to a user for execution of a workflow wherein the workflow has one or more steps executable by the user in a work environment;
receiving at the work device, a first message indicative of an occurrence of an event on a second device communicatively coupled to the work device;
sending, by the processor, a first request to the first device to terminate a first connection with the work device, wherein the first request is received in response to the first message indicative of the occurrence of an event on the second device;
terminating, by the processor, the first connection of the first device with the work device;
sending, by the processor, a second request to communicatively couple to the second device;
receiving, by the processor, a second message indicative of completion of the event on the second device; and
terminating, by the processor, a second connection with the second device.

11. The method of claim 10, wherein the event corresponds to an incoming call request on the second device.

12. The method of claim 10, wherein the first request and the second request correspond to a Bluetooth classic request.

13. The method of claim 10, wherein the second device communicates to the work device via a Bluetooth low energy protocol.

14. The method of claim 10, the work device communicates with the first device via Generic ATTribute Profile ("GATT") services.

15. A wearable device, comprising:
a memory to store computer-executable instructions:
a processor, that performs operations in response to executing the computer-executable instructions, the operations comprising:
receiving a first message indicative of occurrence of an event on a first device, wherein the first device is communicatively coupled to a second device and the second device is communicatively coupled to a wearable electronic device;
in response to receiving the first message indicating occurrence of the event on the first device, pausing a workflow operation executing on at least one of the second device and the wearable electronic device, wherein the workflow operation comprises one or more steps performable by an operator in a work environment;
receiving a first disconnection request from the second device, wherein the first disconnection request is to terminate a first connection of the wearable electronic device with the second device;
in response to receiving the first disconnection request, sending a first connection request to communicatively couple the wearable electronic device with the first device;
receiving a second message indicative of completion of the event on the first device;
receiving a second disconnection request from the first device, wherein the second disconnection request is to terminate a second connection of the wearable electronic device with the first device;
sending a second connection request to communicatively couple the wearable electronic device to the second device; and
resuming the workflow operation on at least one of the second device and the wearable electronic device.

16. The device of claim 15, the operations further comprising:
   establishing the second connection between the wearable electronic device and the first device in response to receiving a first prompt from a worker, wherein the first prompt indicates acceptance of an incoming call request.

17. The device of claim 15, wherein the event corresponds to an incoming call request on the first device.

18. The device of claim 15, wherein the first connection request and the second connection request correspond to a Bluetooth classic connection request.

19. The device of claim 15, the operations further comprising:
   generating a voice notification indicative of reception of incoming call request on the first device.

20. The device of claim 15, wherein the second connection of the wearable electronic device with the first device is terminated in response to receiving, a second prompt from a worker indicating end call request.

\* \* \* \* \*